(12) United States Patent
Katoch et al.

(10) Patent No.: US 11,694,431 B2
(45) Date of Patent: *Jul. 4, 2023

(54) SYSTEMS AND METHODS FOR SKYLINE PREDICTION FOR CYBER-PHYSICAL PHOTOVOLTAIC ARRAY CONTROL

(71) Applicants: Sameeksha Katoch, Tempe, AZ (US); Pavan Turaga, Tempe, AZ (US); Andreas Spanias, Tempe, AZ (US); Cihan Tepedelenlioglu, Tempe, AZ (US)

(72) Inventors: Sameeksha Katoch, Tempe, AZ (US); Pavan Turaga, Tempe, AZ (US); Andreas Spanias, Tempe, AZ (US); Cihan Tepedelenlioglu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,120

(22) Filed: Sep. 20, 2021

(65) Prior Publication Data
US 2022/0004772 A1    Jan. 6, 2022

Related U.S. Application Data

(62) Division of application No. 16/441,939, filed on Jun. 14, 2019, now Pat. No. 11,132,551.

(Continued)

(51) Int. Cl.
| | |
|---|---|
| *G06N 7/01* | (2023.01) |
| *G06V 20/00* | (2022.01) |
| *G06F 17/16* | (2006.01) |
| *G06T 7/246* | (2017.01) |
| *H02J 3/38* | (2006.01) |

(Continued)

(52) U.S. Cl.
CPC .............. *G06V 20/00* (2022.01); *G06F 17/16* (2013.01); *G06F 18/213* (2023.01); *G06N 7/01* (2023.01); *G06T 7/246* (2017.01); *G06V 10/764* (2022.01); *G06V 10/7715* (2022.01); *G06V 20/38* (2022.01); *G06V 20/41* (2022.01);

(Continued)

(58) Field of Classification Search
CPC ........... G06K 9/00718; G06K 9/00697; G06K 9/6202; G06K 9/00744; G06K 9/00624; G06K 9/6251; G06K 9/6232; G06K 9/6277; H02J 3/388; H02J 2300/22; H02J 3/381; G06F 17/16; G06N 7/005; G06T 7/246; Y02E 10/56
USPC ........ 382/100, 103, 181, 190, 195, 203, 197
See application file for complete search history.

(56) References Cited

U.S. PATENT DOCUMENTS

| | | |
|---|---|---|
| 7,010,167 B1 | 3/2006 | Ordowski et al. |
| 8,189,877 B2 | 5/2012 | Asner |

(Continued)

OTHER PUBLICATIONS

U.S. Appl. No. 16/901,961, Jayasuriya et al., filed Jun. 15, 2020.

(Continued)

*Primary Examiner* — Sheela C Chawan
(74) *Attorney, Agent, or Firm* — Polsinelli PC

(57) ABSTRACT

Various embodiments of a cyber-physical system for providing cloud prediction for photovoltaic array control are disclosed herein.

9 Claims, 16 Drawing Sheets
(14 of 16 Drawing Sheet(s) Filed in Color)

Related U.S. Application Data

(60) Provisional application No. 62/685,807, filed on Jun. 15, 2018.

(51) Int. Cl.
  *G06V 20/40* (2022.01)
  *G06F 18/213* (2023.01)
  *G06V 10/764* (2022.01)
  *G06V 10/77* (2022.01)

(52) U.S. Cl.
  CPC ............... *G06V 20/46* (2022.01); *H02J 3/38* (2013.01); *H02J 3/381* (2013.01); *H02J 2300/22* (2020.01)

(56) References Cited

U.S. PATENT DOCUMENTS

| | | |
|---|---|---|
| 8,264,195 B2 | 9/2012 | Takehara et al. |
| 8,989,483 B2 | 3/2015 | Cheng et al. |
| 9,031,809 B1 | 5/2015 | Kumar et al. |
| 10,387,751 B2 | 8/2019 | Braun et al. |
| 11,132,551 B2 * | 9/2021 | Katoch ............... H02J 3/38 |
| 2010/0309330 A1 | 12/2010 | Beck |
| 2012/0320219 A1 | 12/2012 | David et al. |
| 2015/0302575 A1 | 10/2015 | Sun et al. |
| 2015/0371440 A1 | 12/2015 | Pirchheim et al. |
| 2019/0158011 A1 | 5/2019 | West et al. |

OTHER PUBLICATIONS

Knapp, E. D., & Samani, R. (2013). Applied Cyber Security and the Smart Grid: Implementing Security Controls into the Modern Power Infrastructure. Newnes Elsevier.

Akram, M. et al., "Modeling and Health Monitoring of DC Side of Photovoltaic Array", IEEE Transactions on Sustainable Energy, Oct. 2015 (Date of Publication: May 20, 2015), vol. 6, No. 4, pp. 1245-1253 <DOI:10.1109/TSTE.2015.2425791>.

Alzahrani, S., "Matlab-Source-Code-An-Implementation-of-the-Expectation-Maximization-Algorithm v1" [online], Zenodo, Sep. 2016 [retrieved on Jul. 1, 2020], retrieved from the internet: <URL:https://zenodo.org/record/61756>.

Anirudh, R., & Turaga, P. (2016). Geometry-based Symbolic Approximation for Fast Sequence Matching on Manifolds. International Journal of Computer Vision, 116(2), 161-173.

Anirudh, R., Venkataraman, V., & Turaga, P. (2015). A Generalized Lyapunov Feature for Dynamical Systems on Riemannian Manifolds. In 1st International Workshop on Differential Geometry in Computer Vision (Diff-CV), BMVC Workshops.

Bacher, P. et al., "Online short-term solar power forecasting", Solar Energy, Oct. 2009 (available online Jul. 2009), vol. 83, No. 10, pp. 1772-1783 <DOI:10.1016/j.solener.2009.05.016>.

Berisha, V. et al., "Empirically Estimable Classification Bounds Based on a Nonparametric Divergence Measure", IEEE Transactions on Signal Processing, Feb. 2016 (Date of Publication: Sep. 2015), vol. 64, No. 3, pp. 580-591 <DOI:10.1109/TSP.2015.2477805>.

Bompard, E., Huang, T., Wu, Y., & Cremenescu, M. (2013). Classification and Trend Analysis of Threats Origins to the Security of Power Systems. International Journal of Electrical Power & Energy Systems, 50, 50-64.

Bosco, N., "Reliability Concerns Associated with PV Technologies", National Renewable Energy Laboratory (NREL), Apr. 2010, 11 pages.

Braun, H. et al., "Direct Classification from Compressively Sensed Images via Deep Boltzmann Machine", 2016 50th Asilomar Conference on Signals, Systems and Computers (Pacific Grove, CA, Nov. 6-9, 2016), 2016 [Date Added to IEEE Xplore: Mar. 6, 2017], pp. 454-457 <DCI:10.1109/ACSSC.2016.7869080>.

Braun, H., Buddha, S. T., Krishnan, V., Spanias, A., Tepedelenlioglu, C., Takehara, T., Takada, S., Yeider, T., & Banavar, M. (2012, September). Signal Processing for Solar Array Monitoring. Fault Detection, and Optimization-Synthesis Lectures on Power Electronics, Morgan & Claypool Publishers. 7(1), 1-95.

Braun, H., Buddha, S. T., Krishnan, V., Spanias, A., Tepedelenlioglu, C., Yeider, T., & Takehara, T. (Mar. 2012). Signal Processing for Fault Detection in Photovoltaic Arrays. In IEEE International Conference on Acoustics, Speech and Signal Processing (ICASSP) (pp. 1681-1684). IEEE.

Braun, H., Buddha, S. T., Krishnan, V., Tepedelenlioglu, C., Spanias, A., Banavar, M., & Srinivasan, D. (2016). Topology Reconfiguration for Optimization of Photovoltaic Array Output. Sustainable Energy, Grids and Networks, 6, 58-69.

Buddha, S. et al., "Signal Processing for Photovoltaic Applications", 2012 IEEE International Conference on Emerging Signal Processing Applications (Las Vegas, NV, Jan. 12-14, 2012), 2012 [Date Added to IEEE Xplore Feb. 16, 2012], pp. 115-118 <DOI:10.1109/ESPA.2012.6152459>.

Cadez, I. et al., "Hierarchical Models for Screening of Iron Deficiency Anemia", Proceedings of the International Conference on Machine Learning, Jun. 1999, pp. 77-86.

Chan, A. et al., "Modeling, Clustering, and Segmenting Video with Mixtures of Dynamic Textures", IEEE Transactions on Pattern Analysis and Machine Intelligence, May 2008 (Date of Publication: Mar. 2008), vol. 30, No. 5, pp. 909-926 <DOI:10.1109/TPAMI.2007.70738>.

Chu, Y. et al., "A Smart Image-Based Cloud Detection System for Intrahour Solar Irradiance Forecasts", Journal of Atmospheric and Oceanic Technology, Sep. 2014, vol. 31, No. 9, pp. 1995-2007 <DOI:10.1175/JTECH-D-13-00209.1>.

Ciabattoni, L. et al., "Solar Irradiation Forecasting using RBF Networks for PV Systems with Storage", 2012 IEEE International Conference on Industrial Technology (Athens, Greece, Mar. 19-21, 2012), 2012 [Date Added to IEEE Xplore: Jun. 4, 2012], pp. 699-704 <DOI:10.1109/ICIT.2012.6210020>.

Dasarathan, S. et al., "Robust Consensus in the Presence of Impulsive Channel Noise", IEEE Transactions on Signal Processing, Apr. 2015 (Date of Publication: Mar. 4, 2015), vol. 63, No. 8, pp. 2118-2129 <DOI:10.1109/TSP.2015.2408564>.

Di Lorenzo, P., & Barbarossa, S. (2014). Distributed Estimation and Control of Algebraic Connectivity over Random Graphs. IEEE Transactions on Signal Processing, 62(21), 5615-5628.

Doretto, G., Chiuso, A., Wu, Y. N., & Soatto, S. (2003). Dynamic Textures. International Journal of Computer Vision, 51(2), 91-109.

Du, G. et al., "Based on the Internet of things a self-cleaning solar power system of the household micro-grid", 2016 Chinese Control and Decision Conference (Yinchuan, China, May 28-30, 2016), 2016 [Date Added to IEEE Xplore: Aug. 8, 2016], pp. 2889-2890 <DOI:10.1109/CCDC.2016.7531475>.

Edelman, A. et al., "The Geometry of Algorithms with Orthogonality Constraints", SIAM Journal on Matrix Analysis and Application, 1998, vol. 20, No. 2, pp. 303-353 <DOI:10.1137/S0895479895290954>.

Feng, T., Liu, Z., Kwon, K. A., Shi, W., Carbunar, B., Jiang, Y., & Nguyen, N. (Nov. 2012). Continuous Mobile Authentication Using Touchscreen Gestures. In IEEE Conference on Technologies for Homeland Security (HST), 2012 (pp. 451-456). IEEE.

Frank, M., Biedert, R., Ma, E., Martinovic, I., & Song, D. (2013). Touchalytics: On the Applicability of Touchscreen Input as a Behavioral Biometric for Continuous Authentication. IEEE transactions on Information Forensics and Security, 8(1), 136-148.

Gonzalez, S., Kuszmaul, S., Deuel, D., & Lucca, R. (Jun. 2010). PV Array Simulator Development and Validation. In 35th IEEE Photovoltaic Specialists Conference (PVSC), 2010 (pp. 002849-002852). IEEE.

Gregory, G. et al., "The Arc-Fault Circuit Interrupter: an Emerging Product", IEEE Transactions on Industry Applications, Sep./Oct. 1998, vol. 34, No. 5, pp. 928-933 <DOI:10.1109/28.720431>.

Haeberlin, H. et al., "Measurement of Damages at Bypass Diodes by Induced Voltages and Currents in PV Modules Caused by Nearby Lightning Currents with Standard Waveform", 23rd European Photovoltaic Solar Energy Conference (Valencia, Spain, Sep. 1-5, 2008), 2008, 14 pages.

Hassanzadeh, M. et al., "Practical Approach for Sub-Hourly and Hourly Prediction of PV Power Output", North American Power

(56) References Cited

OTHER PUBLICATIONS

Symposium (Arlington, TX, Sep. 26-28, 2010), 2010 [Date Added to IEEE Xplore: Nov. 4, 2010], 5 pages <DOI: 10.1109/NAPS.2010.5618944>.

Heinzelman, W. R., Kulik, J., & Balakrishnan, H. (1999, August). Adaptive Protocols for Information Dissemination in Wireless Sensor Networks. In Proceedings of the 5th Annual ACM/IEEE International Conference on Mobile Computing and Networking (pp. 174-185). ACM.

Jiang, L. et al., "Automatic Fault Detection and Diagnosis for Photovoltaic Systems using Combined Artificial Neural Network and Analytical Based Methods", 2015 International Joint Conference on Neural Networks (Killarney, Ireland, Jul. 12-17, 2015), 2015 [Date Added to IEEE Xplore: Oct. 1, 2015], 8 pages <DOI:10.1109/IJCNN.2015.7280498>.

King, D. et al., "Photovoltaic Array Performance Model", Sandia Report—U.S. Department of Energy, Dec. 2004, 43 pages.

Kovvali, N., Banavar, M., & Spanias, A. (2013). An Introduction to Kalman Filtering with Matlab Examples. Synthesis Lectures on Signal Processing, Ed. Morgan & Claypool, 6(2), 1-81.

López, M. E. A., Mantiñan, F. J. G., & Molina, M. G. (Sep. 2012). Implementation of Wireless Remote Monitoring and Control of Solar Photovoltaic (PV) System. In Transmission and Distribution: Latin America Conference and Exposition (T&D-LA), 2012 sixth IEEE/PES (pp. 1-6). IEEE.

Maish, A. et al., "Photovoltaic System Reliability", Conference Record of the 26th IEEE Photovoltaic Specialists Conference (Anaheim, CA, Sep. 29- Oct. 3, 1997), 1997 [Date Added to IEEE Xplore: Aug. 6, 2002], pp. 1049-1054 <DOI:10.1109/PVSC.1997.654269>.

Marquez, R. et al., "Hybrid Solar Forecasting Method Uses Satellite Imaging and Ground Telemetry as Inputs to ANNs" Solar Energy, Jun. 2013 (available online Apr. 2013), vol. 92, pp. 176-188 <DOI:10.1016/j.solener.2013.02.023>.

Muniraju, G., Zhang, S., Tepedelenlioglu, C., Banavar, M., Spanias, A., Vargas-Rosales, C., & Villalpando-Hernandez, R. (in press). (2017). Location Based Distributed Spectral Clustering for Wireless Sensor Networks. IEEE International Conference on Sensor, Signal, Processing for Defence (SSPD). IEEE.

Newman, R., Banavar, M., (in press). (2017). Processing Touchscreen Gesture Data for Continuous Authentication using Machine Learning Techniques. Summer Undergraduate Research Experiences (SURE) Conference. Jul. 2017.

Nguyen, D. D., & Lehman, B. (Jul. 2006). Modeling and Simulation of solar PV arrays under changing illumination conditions. In IEEE Workshops on Computers in Power Electronics, 2006. COMPEL'06. (pp. 295-299). IEEE.

Nilsson, D., "Fault Detection in Photovoltaic Systems", KTH Computer Science and Communication, Master's Thesis at CSC, 2014, 36 pages.

Opengear., "Benefits of IOT for Solar Power" [online], Opengear—a Digi Company, 2017 [retrieved Jun. 25, 2020 from archive.org, as it appeared on Jun. 12, 2017], retrieved from the internet: <URL:https://web.archive.org/web/20170612102406/http://opengear.com/articles/benefits-challenges-iot-solar-energy>.

Peshin, S., Ramirez, D., Lee, J., Braun, H., Tepedelenlioglu, C., Spanias, A., Banavar, M., & Srinivasan, D. (2015). A Photovoltaic (PV) Array Monitoring Simulator. In International Conference on Modeling, Identification, and control, Innsbruck, Austria.

Qin, J., Fu, W., Gao, H., & Zheng, W. X. (2017). Distributed k-Means Algorithm and Fuzzy c-Means Algorithm for Sensor Networks Based on Multiagent Consensus Theory. IEEE transactions on Cybernetics, 47(3), 772-783.

Quaschning, V. et al., "Numerical Simulation of Current-Voltage Characteristics of Photovoltaic Systems with Shaded Solar Cells", Solar Energy, Jun. 1996, vol. 56, No. 6, pp. 513-520 <DOI:10.1016/0038-092X(96)00006-0>.

Quesada-Ruiz, S. et al., "Cloud-tracking methodology for intrahour DNI forecasting", Solar Energy, Apr. 2014 (available online Feb. 2014), vol. 102, pp. 267-275 <DOI:10.1016/j.solener.2014.01.030>.

Ranhotigamage, C., & Mukhopadhyay, S. C. (2011). Field trials and Performance Monitoring of Distributed Solar Panels Using a Low-Cost Wireless Sensors Network for Domestic Applications. IEEE Sensors Journal, 11(10), 2583-2590.

Rao, S. et al., "A cyber-physical system approach for photovoltaic array monitoring and control", 2017 8th International Conference on Information, Intelligence, Systems & Applications (Larnaca, Cyprus, Aug. 27-30, 2017), 2017 [Date Added to IEEE Xplore: Mar. 15, 2018], pp. 1-6 <DOI:10.1109/IISA.2017.8316458>.

Rao, S. et al., "An 18kW Solar Array Research Facility for Fault Detection Experiments", 2016 18th Mediterranean Electrotechnical Conference (Lemesos, Cyprus, Apr. 18-20, 2016), 2016 [Date Added to IEEE Xplore: Jun. 23, 2016], 5 pages <DOI:10.1109/MELCON.2016.7495369>.

Rousseeuw, P. J. (1985). Multivariate Estimation with High Breakdown Point. Mathematical Statistics and Applications, 8, 283-297.

Rousseeuw, P. J., & Driessen, K. V. (1999). A Fast Algorithm for the Minimum Covariance Determinant Estimator. Technometrics, 41(3), 212-223.

Shanthamallu, U., Spanias, A., Tepedelenlioglu, C., & Stanley, M. (in press). (2017). A Brief Survey of Machine Learning Methods and their Sensor and IoT Applications, IEEE International Conference Information, Intelligence, Systems and Applications (IISA). IEEE.

Soatto, S., Doretto, G., & Wu, Y. N. (2001). Dynamic Textures. In Eighth IEEE International Conference on Computer Vision. ICCV 2001. Proceedings. (vol. 2, pp. 439-446). IEEE.

Song, H. et al., "A Deep Learning Approach to Multiple Kernel Fusion", 2017 IEEE International Conference on Acoustics, Speech, and Signal Processing (New Orleans, LA, Mar. 5-9, 2017), 2017 [Date Added to IEEE Xplore: Jun. 19, 2017], pp. 2292-2296 <DOI:10.1109/ICASSP.2017.7952565>.

Song, H. et al., "A Deep Learning Approach to Multiple Kernel Fusion", arXiv, submitted Dec. 28, 2016, 5 pages, arXiv:1612.09007v1.

Song, H. et al., "Consensus inference on mobile phone sensors for activity recognition", 2016 IEEE International Conference on Acoustics, Speech and Signal Processing (ICASSP) (Shanghai, China, Mar. 20-25, 2016), 2016 [date added to IEEE Xplore: May 19, 2016], pp. 2294-2298 <DOI:10.1109/ICASSP.2016.7472086>.

Spanias, A. (in press). (2017) Solar Energy Management as an Internet of Things (IoT) Application. IEEE International Conference on Information, Intelligence, Systems and Applications (IISA). IEEE.

Srivastava, A. et al., "Bayesian and Geometric Subspace Tracking", Advances in Applied Probability, Mar. 2004, vol. 36, No. 1, pp. 43-56.

Tina, G. et al., "Analysis of Forecast Errors for Irradiance on the Horizontal Plane", Energy Conversion and Management, Dec. 2012 (available online Aug. 2012), vol. 64, pp. 533-540 <DOI:10.1016/j.enconman.2012.05.031 >.

Turaga, P., Veeraraghavan, A., Srivastava, A., & Chellappa, R. (2011). Statistical computations on Grassmann and Stiefel Manifolds for Image and Video-based Recognition. IEEE Transactions on Pattern Analysis and Machine Intelligence, 33(11), 2273-2286.

Utkarsh, K., Trivedi, A., Srinivasan, D., & Reindl, T. (2017). A Consensus-Based Distributed Computational Intelligence Technique for Real-Time Optimal Control in Smart Distribution Grids. IEEE Transactions on Emerging Topics in Computational Intelligence, 1(1), 51-60.

Villalva, M. et al., "Comprehensive Approach to Modeling and Simulation of Photovoltaic Arrays", IEEE Transactions on Power Electronics, May 2009 (Date of Publication: Mar. 27, 2009), vol. 24, No. 5, pp. 1198-1208 <DOI:10.1109/TPEL.2009.2013862>.

Zhang, S., Tepedelenlioglu, C., Banavar, M. K., & Spanias, A. (2016). Max Consensus in Sensor networks: Non-linear Bounded Transmission and Additive Noise. IEEE Sensors Journal, 16(24), 9089-9098.

(56) References Cited

OTHER PUBLICATIONS

Zhang, S., Tepedelenlioglu, C., Banavar, M. K., & Spanias, A. (2017). Distributed Node Counting in Wireless Sensor Networks in the Presence of Communication Noise. IEEE Sensors Journal, 17(4), 1175-1186.

Zhao, Y., Balboni, F., Arnaud, T., Mosesian, J., Ball, R., & Lehman, B. (Jun. 2014). Fault Experiments in a Commercial-scale PV Laboratory and Fault Detection using Local Outlier Factor. In IEEE 40th Photovoltaic Specialist Conference (PVSC), 2014 (pp. 3398-3403). IEEE.

Zhao, Y., Ball, R., Mosesian, J., de Palma, J. F., & Lehman, B. (2015). Graph-based Semi-Supervised Learning for Fault Detection and Classification in Solar Photovoltaic Arrays. IEEE Transactions on Power Electronics, 30(5), 2848-2858. IEEE.

Zhao, Y., Yang, L., Lehman, B., de Palma, J. F., Mosesian, J., & Lyons, R. (Feb. 2012). Decision tree-based Fault Detection and Classification in Solar Photovoltaic Arrays. In Twenty-Seventh Annual IEEE Applied Power Electronics Conference and Exposition (APEC), 2012 (pp. 93-99). IEEE.

\* cited by examiner

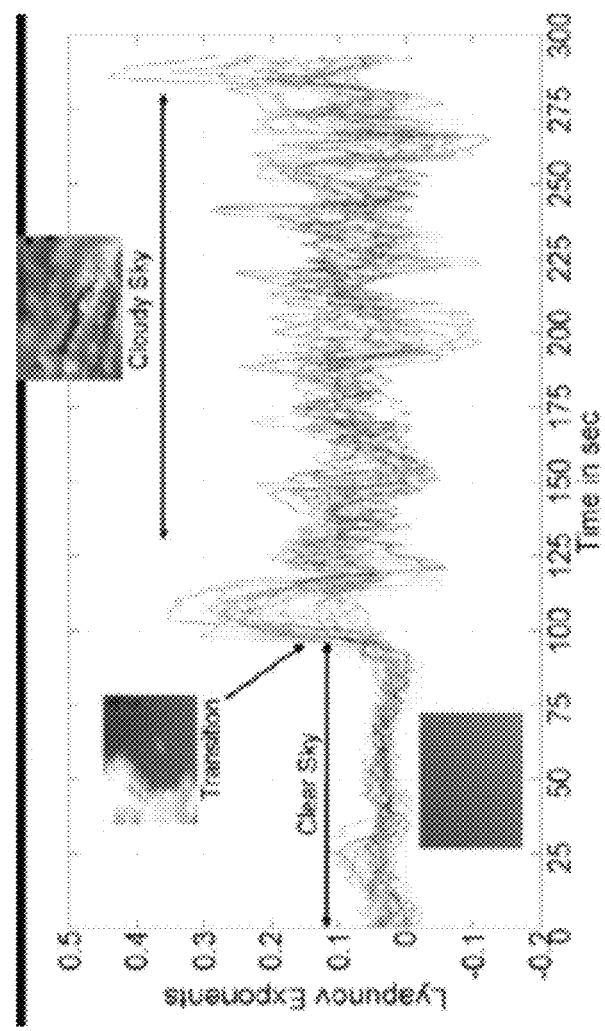
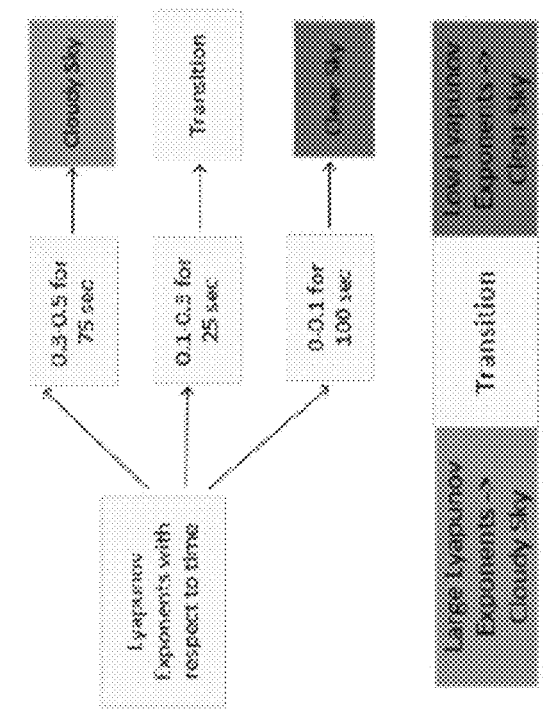
FIG. 6A
FIG. 6B

SYSTEMS AND METHODS FOR SKYLINE PREDICTION FOR CYBER-PHYSICAL PHOTOVOLTAIC ARRAY CONTROL

CROSS REFERENCE TO RELATED APPLICATIONS

This is a divisional application that claims benefit to U.S. patent application Ser. No. 16/441,939 filed on Jun. 14, 2019 and U.S. provisional application Ser. No. 62/685,807 filed on Jun. 15, 2018, which are herein incorporated by reference in their entireties.

GOVERNMENT SUPPORT

This invention was made with government support under 1646542 awarded by the National Science Foundation. The government has certain rights in the invention.

FIELD

The present disclosure generally relates to predictive control of utility-scale photovoltaic (PV) arrays, and in particular, to systems and methods for skyline prediction for cyber-physical photovoltaic array control.

BACKGROUND

Utility-scale photovoltaic (PV) array systems are being rapidly deployed in several areas and are now capable of generating several megawatts of power. Although progress in several associated technologies has enabled increased efficiencies and reduced cost, the large number of panels installed in remote areas makes it difficult and expensive to detect and localize faults. Solar power generation is affected by several factors such as shading due to cloud cover, soiling on the panels, unexpected faults and weather conditions. Hence, the efficiency of solar energy farms requires detailed analytics on each panel by sensing individual panel voltage, current, temperature and irradiance.

In addition, there has also been an upward trend in solar array installations in recent years. However, the major drawback to incorporate these solar array installations into main power grids is the massive fluctuations in the power output due to weather unpredictability. This has led to a need for methods which can classify the weather as clear sky, moderate sky or overcast sky beforehand as well as methods that can provide information about the direction and speed of cloud movement.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6A is a graphical representation showing the largest Lyapunov exponents for temporal modeling of the skyline used to obtain the transition from clear-cloudy sky to cloudy sky; and FIG. 6B is a simplified block diagram showing the temporal modeling;

Corresponding reference characters indicate corresponding elements among the view of the drawings. The headings used in the figures do not limit the scope of the claims.

DETAILED DESCRIPTION

Various embodiments of a cyber-physical system for a utility-scale Photovoltaic (PV) array monitoring and control are disclosed herein. In some embodiments, the cyber-physical system includes a plurality of sensors that capture voltage, current, temperature, and irradiance parameters for each solar panel which are then used to detect, predict and control the performance of the solar array. The present disclosure describes a computer vision framework for cloud movement prediction. In addition, the present system uses a consensus-based distributed approach for resource optimization, as well as a fault detection strategy.

In one aspect, the cyber-physical system leverages video analysis of skyline imagery that is used along with other measured parameters to reconfigure the solar panel connection topology and optimize power output. Preliminary results disclosed herein demonstrate improved efficiency and robustness in renewable energy systems using advanced cyber enabled sensory analysis and fusion devices and algorithms.

Figure 1:
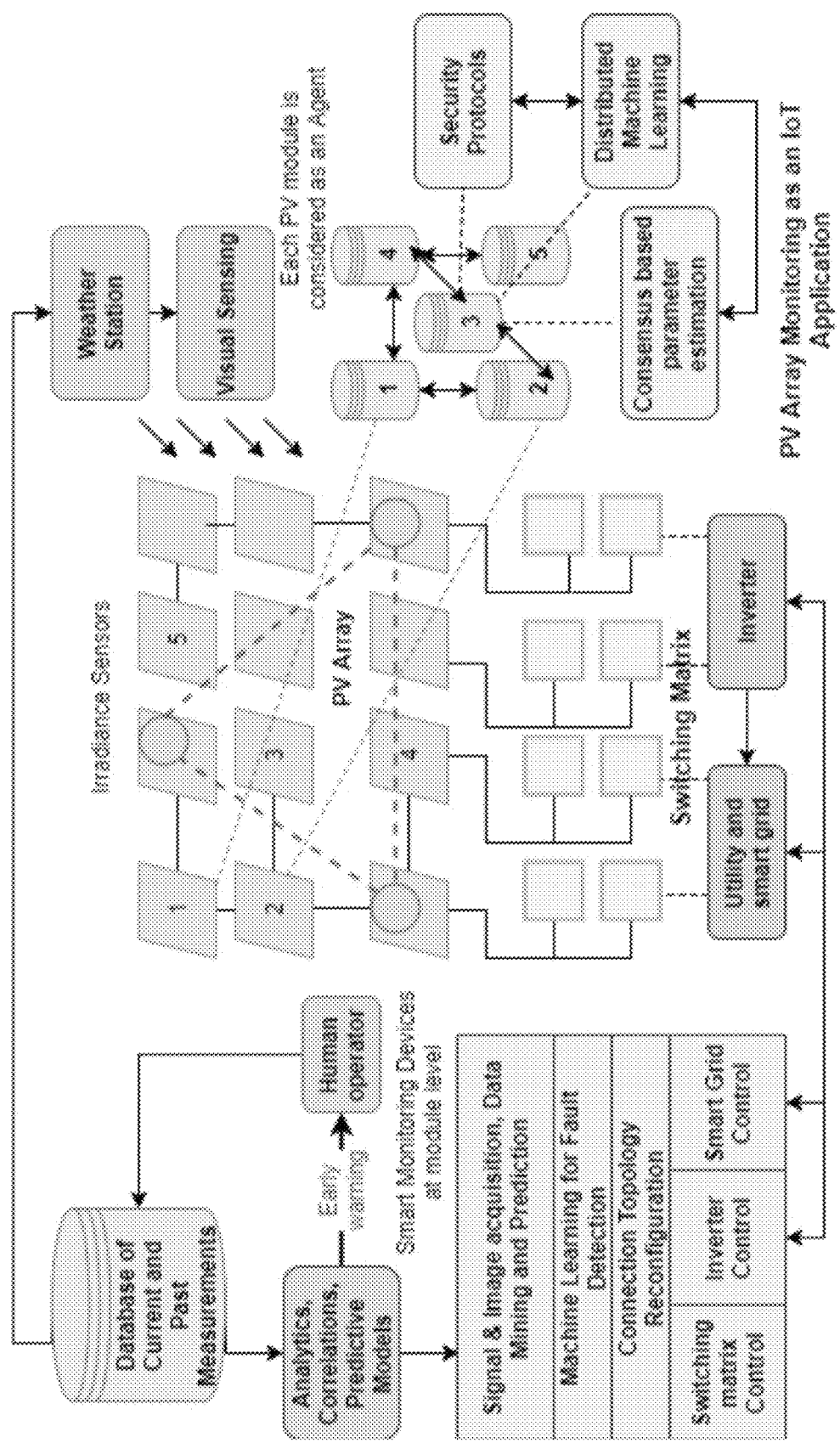
FIG. 1 is a simplified illustration showing a networked PV array concept for enabling weather feature correlations, local shading prediction, decision support, and fault detection.

One embodiment of the cyber-physical system (CPS) is shown in the block diagram of FIG. 1, where hardware and algorithms are integrated to detect faults, predict shading, provide real-time analytics for each panel, optimize power, and reduce transients.

The present disclosure describes theoretical and experimental aspects of the CPS system, along with implementation details. The methods presented in the present disclosure were validated on a solar array testbed shown in FIGS. 2A and 2B. This testbed consists of 104 panels with a power generation capacity of 18 kW and was developed by the Sensor Signal and Information Processing (SenSIP) Center at Arizona State University (ASU). The cyber-physical system is enabled by unique smart monitoring devices (SMDs) shown in FIG. 3, which are equipped with voltage, current, temperature and irradiance sensors. The SMDs also include relays and radios which enable each solar panel to obtain and transmit real-time analytics.

The potential role of sensing and monitoring in the PV context, focusing on the areas of fault detection, topology optimization, and performance evaluation is discussed herein. SMD relays operate upon command to reconfigure the connection topology and present the communication aspects of an array of solar panels in the context of Internet of Things (IoT).

One embodiment of a cloud movement prediction system is disclosed herein to counter the effects of partial panel shading on the PV output. In order to predict cloud movement, camera and satellite sensing of skyline features were used. The ability to predict shading enables strategies for power grid control, array topology reconfiguration, and control of inverter transients.

In addition, some embodiments of the system utilize a classification method for clustering I-V measurements to detect and classify PV panel faults. The potential to detect and localize PV faults remotely provides opportunities for bypassing faulty panels without disrupting the inverters. A large utility-scale cyber-physical system aggregating the sensor measurements at a single fusion center can be inefficient in terms of power and memory requirements. To overcome these disadvantages and obtain robust analytics, a consensus-based fully distributed approach was utilized.

Dynamic Models for Skyline Videos

Penetration of solar grids into main power grids still poses a large problem due to the intermittency and uncertainty of weather conditions. However, prior availability of weather conditions is a step towards solving this issue. Cloud cover serves as the major hindrance to the constant power output from a solar farm. To perform any kind of power output optimization, prediction of cloud movement ahead of time is a major prerequisite. In order to counter the effects of partial panel shading on the PV output, an embodiment of a skyline feature prediction system is disclosed herein which aims to classify between clear and overcast skies as well as performs modeling of the transition between the two.

A short video of skyline features is considered which is modeled as a Linear Dynamical System (LDS) driven by zero mean white Gaussian noise.

$$f(t) = C z(t) + w(t) \quad w(t) \sim N(O, R)$$
$$z(t+1) = Az(t) + v(t), \quad v(t) \sim N(O, Q)$$

wherein, $z \in \mathbb{R}^d$ is the hidden state vector, $A \in \mathbb{R}^{d \times d}$, the transition matrix and $C \in \mathbb{R}^{p \times d}$, the measurement matrix. The function $f \in \mathbb{R}^p$ represents the observed features while w and v are noise components modeled as normal with zero mean and covariances $R \in \mathbb{R}^{p \times p}$ and $Q \in \mathbb{R}^{d \times d}$ respectively.

A models the dynamics of the hidden state while C marks the appearance of the image patch. Thus M=(A, C) mark the feature that describes the whole video. The model can be used to represent the evolution of the conditional density of the state by updating the samples which can be achieved by Condensation filters. The LDS model is one of the most popular models for prediction of dynamic texture patterns; however, its parameters are viewed as subspaces formed by the columns of the observability matrix.

In some embodiments, the observability matrix is given by:

$$O_\infty^T = [C^T, (CA)^T, (CA^2)^T, \ldots, (CA^n)^T, \ldots],$$

however, the truncated version is used in practice. The column space of the truncated matrix is a d-dimensional subspace of $\mathbb{R}^{mp}$, where d is the dimension of the state-space z and is typically of the order of 5-10. Formally, the set of all d-dimensional linear subspaces of $\mathcal{G}^n$ is called the Grassmannian manifold which will be denoted as $\mathcal{G}$ n,d. This provides an advantage of utilizing the geometric properties of Grassmannian which are well developed and known.

Figure 4:
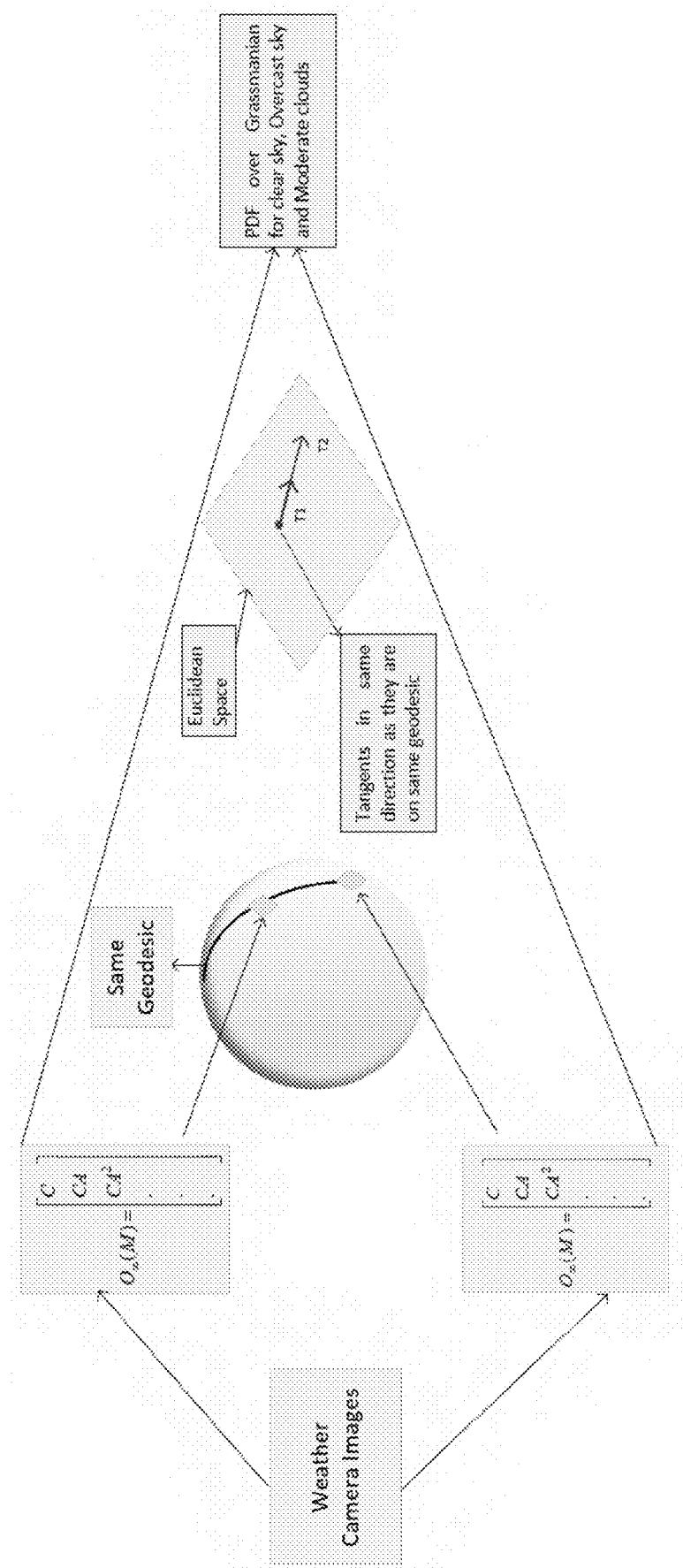
FIG. 4 is a simplified illustration showing tangent vectors obtained through exponential maps used in a multivariate statistical analysis.

Since the parameters feature descriptors are LDS, which don't lie in Euclidean space, classical multivariate statistical tools are not applicable. A Grassmannian Manifold as mentioned above is a set of the set of all d-dimensional linear subspaces of $\mathbb{R}^n$ and to perform any statistical analysis the curved space structure is linearized to tangent-space structure of underlying manifold. Here the concepts like exponential/inverse exponential maps, illustrated in FIG. 4, come in handy. For any point [W] on Grassmannian manifold, the tangent space at [W] is given by $T_{[W]}(\mathcal{G}$ n,d$)=\{O^T G | G \in T_{[J]}(\mathcal{G}$ n,d$)\}$ where Grassmannian manifold is denoted by $\mathcal{G}$ n,d and $W=O^T J$ and $O \in SO(n)$. $\mathcal{G}$ n,d can also be denoted as simply $SO(n)/(SO(d) \times SO(n-d))$. The dimension of tangent vectors is similar to the features from skyline video leading to high computational complexity because of high dimension. This can be reduced using geodesic principle components. Once those tangent vectors are obtained, they will be utilized as input to various statistical tools.

Figure 5A:
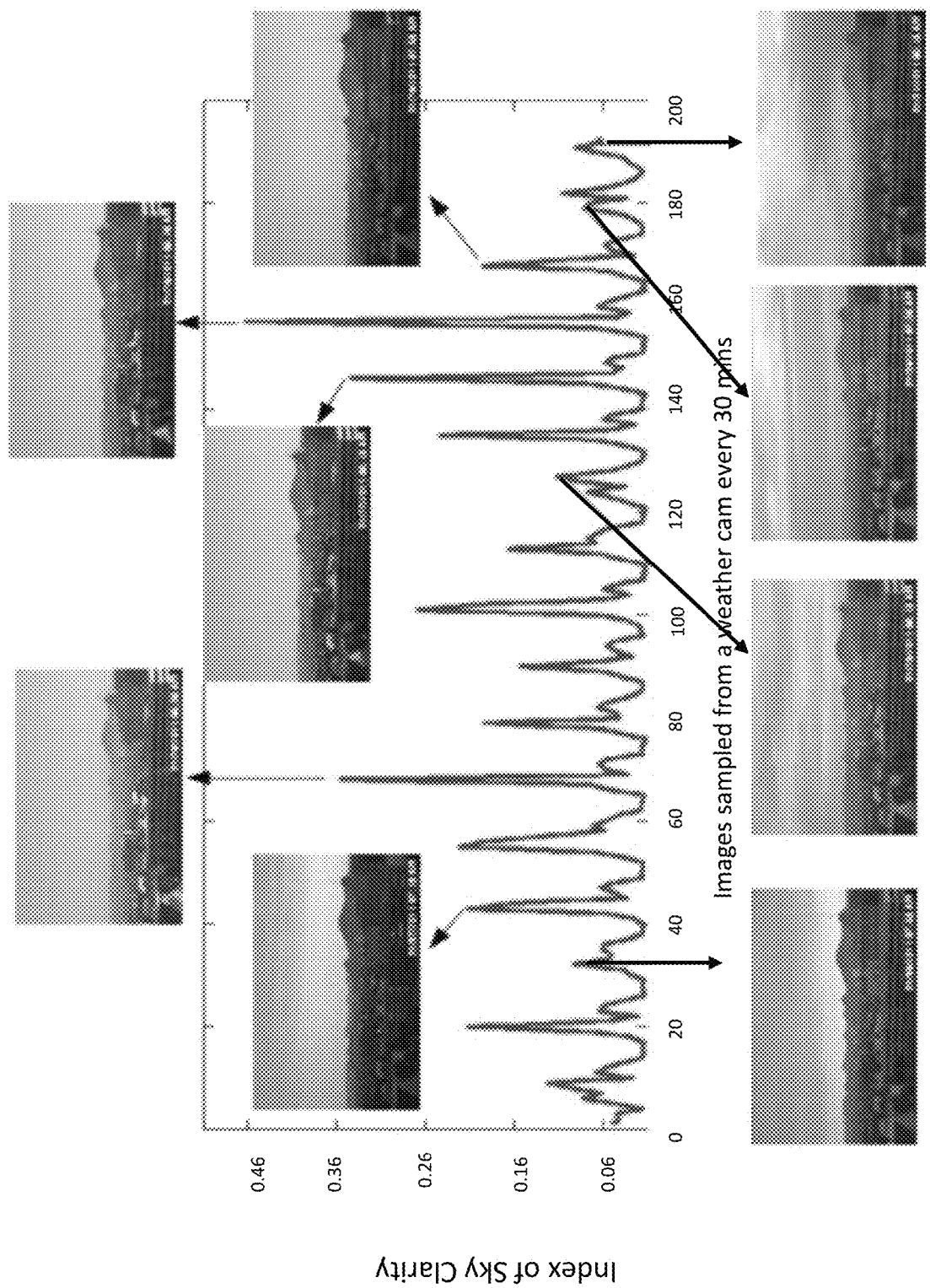
FIG. 5A is a graphical representation and related pictures showing the distinction between clear and hazy skies.
Figure 5B:
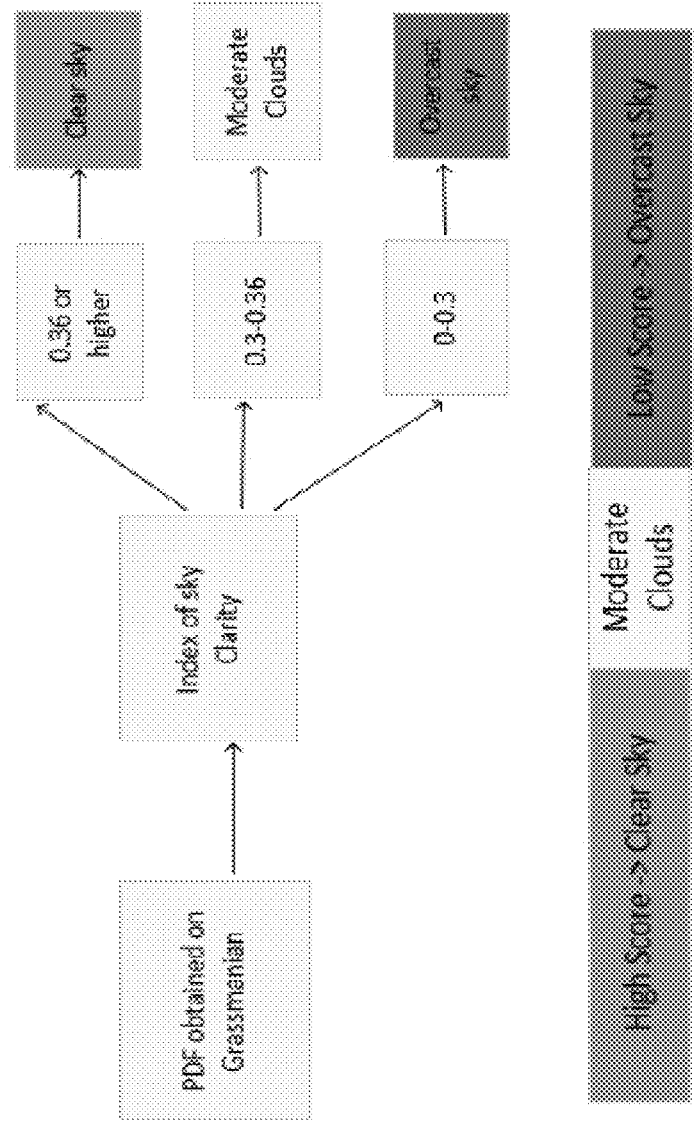
FIG. 5B is a simplified block diagram showing the score obtained from conditional PDFs.

In some embodiments of the present system, a month-long video dataset from a weather cam is used with the capture rate of 1 frame/30 minutes and a training set is developed with three classes namely clear, light clouds and overcast as shown in FIGS. 5A and 5B. Since the features are LDS and they lie on Grassmannian manifold, a probability density function is calculated and based on that a score is assigned where high score implies clear sky and low score implies overcast sky. However, to understand the transition between clear and overcast sky temporal evolution of dynamic textures is an important property.

In some embodiments, the largest Lyapunov exponents were used to create a distinction between the classes with the given spatiotemporal information as shown in FIGS. 6A and 6B; however, for long duration non-parametric approaches avoids error residuals and restrictive assumptions inherent in parametric approaches. To this end, a fast dynamic-texture synthesis algorithm was proposed. Computational tools from chaotic time-series analysis were taken into account. The method of phase space reconstruction using delay embeddings was considered. Chaotic time series is deterministic in phase-space enabling the computation of a mapping function for video prediction feasible in phase-space. Simple regression models can be utilized for prediction in phase space. Information from the image pixels has more smooth and deterministic evolution along the trajectory in phase space. Reconversion from phase space can be achieved.

Figure 7:
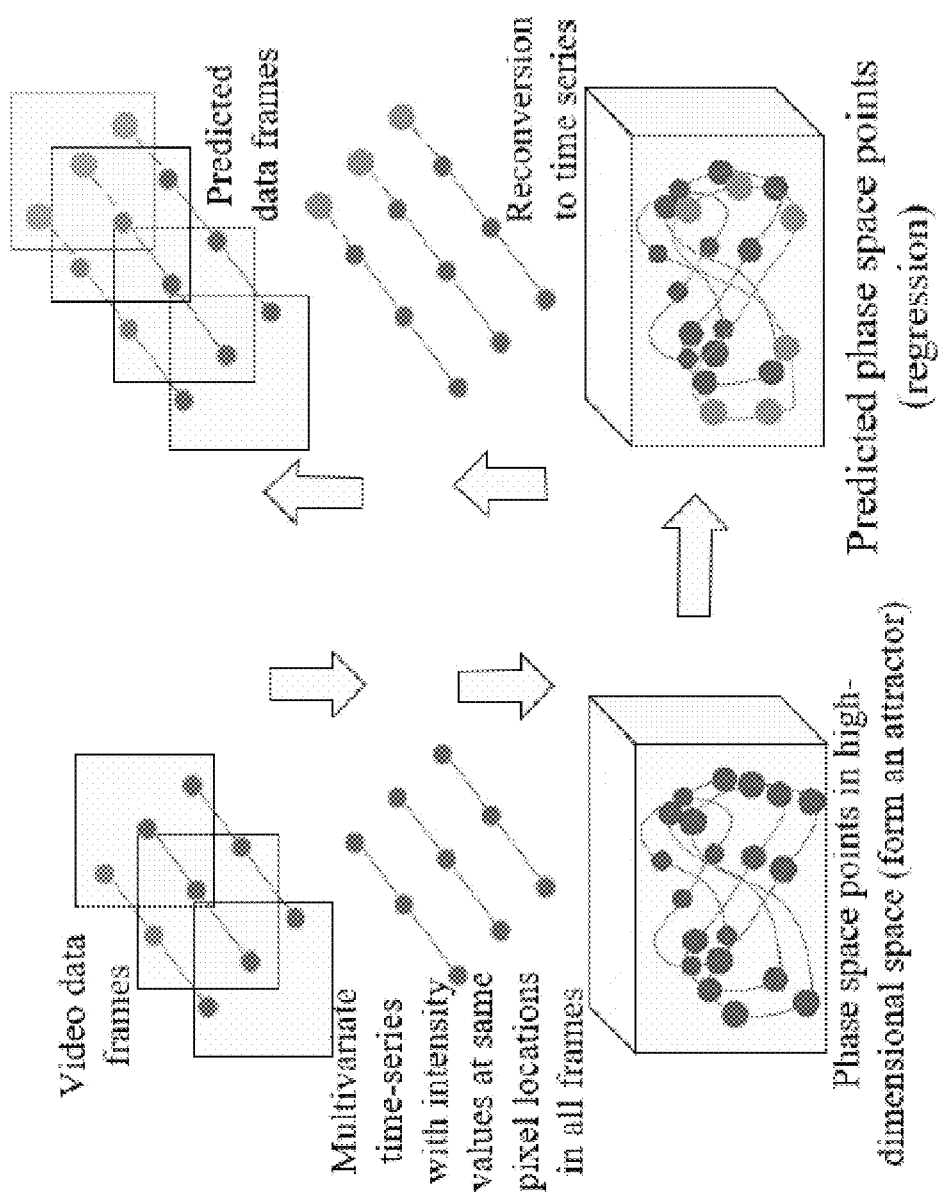
FIG. 7 is a simplified block diagram overview of the non-parametric skyline prediction method of the present system.

The non-parametric approach models video data as a non-linear dynamical process at the patch-level. Prediction of future evolution is solved in phase-space via fast regression methods. An overview of the predictive aspect of the present system is shown in FIG. 7. Each of the components in the pipeline is described in more detail as follows.

Phase-Space Reconstruction:

Let I(x,y,t) represent a video where (x,y) represents the locations of the pixels and t represents the time instant of each frame. Let $N_1$ and $N_2$ represent number of rows and columns in a given frame, respectively. Let $p_{s,t}$ form the scalar valued time-series of pixel values at location (x,y) where s iterates over the given frame and ranges between 1 M, where $M=N_1N_2$. All the scalar valued time series are stacked in the matrix $P \in R^{M \times T}$ where T represents the total number of frames.

For a multivariate time series:

$$p_t = [p_{1,t}, p_{2,t}, p_{3,t} \ldots p_{M,t}]^T \in R^M$$

$$P = [p_1, p_2, \ldots p_T] \in R^{M \times T}$$

Next, a conversion of multivariate chaotic time series to high dimensional phase-space must be performed. The phase-space conversion is performed using the embedding parameters namely, embedding delay and embedding dimension. A phase-space matrix is formed which is given by:

$$E = [e_0, e_1, e_2 \ldots e_N]^T \in R^{Nx \sum_{i=1}^{M} d_i},$$

where N is given by number of non-zero embedding dimensions and each delay vector is defined as:

$$e_t = \left[ p_{1,t}, p_{1,t+\tau 1}, \ldots p_{1,t+(d1-1)\tau 1}, p_{2,t}, p_{2,t+\tau 2}, \ldots p_{2,t+(d2-1)\tau 2}, p_{M,t}, \right.$$

$$\left. p_{M,t+\tau M}, \ldots p_{M,t+(dM-1)\tau M} \right]^T \in R^{Nx \sum_{i=1}^{M} d_i},$$

where $\tau_i$ and $d_i$ represent embedding delay and dimension respectively. The minimum embedding delay is obtained by finding the lowest mutual information between the samples. The minimum embedding dimension is obtained, while minimizing the number of false nearest neighbors due to dimension reduction. The value of embedding dimension ranges from 6 to 9 for the considered dataset.

Phase-Space Prediction:

The resultant phase-space vectors are stacked to form a matrix where each row forms a trajectory in phase-space. The obtained points lie along a trajectory in phase-space bringing about smoother evolution unlike the evolution in the time domain. A simple kernel regression is chosen in order to obtain the consecutive phase-space points using the weighted average of the neighboring points.

$$e_{t+1} = F(e_t) = \sum_{k=1}^{N(e_t)} (x_{k+1} - x_k + e_t) w_k(e_t, x_k),$$

where $x_k \in E$ is kth nearest neighbor of $e_t$, $N(e_t)$ represent the number of nearest neighbors and $w_k(e_t, x_k)$ is given by:

$$w_k(e_t, x_k) = \frac{K_h(\|e_t - x_k\|)}{\sum_{k=1}^{N(e_t)} K_h(\|e_t - x_k\|)}$$

where h represents the bandwidth of the kernel and number of nearest neighbors is fixed to 6. For large datasets i.e. for videos with high spatial and temporal complexity, the execution time of exhaustive nearest neighbor search becomes a bottleneck regarding computation time. In order to improve the computation time efficiency for nearest neighbor search, approximate nearest neighbors are used via Locality Sensitive Hashing (LSH).

Figure 8:
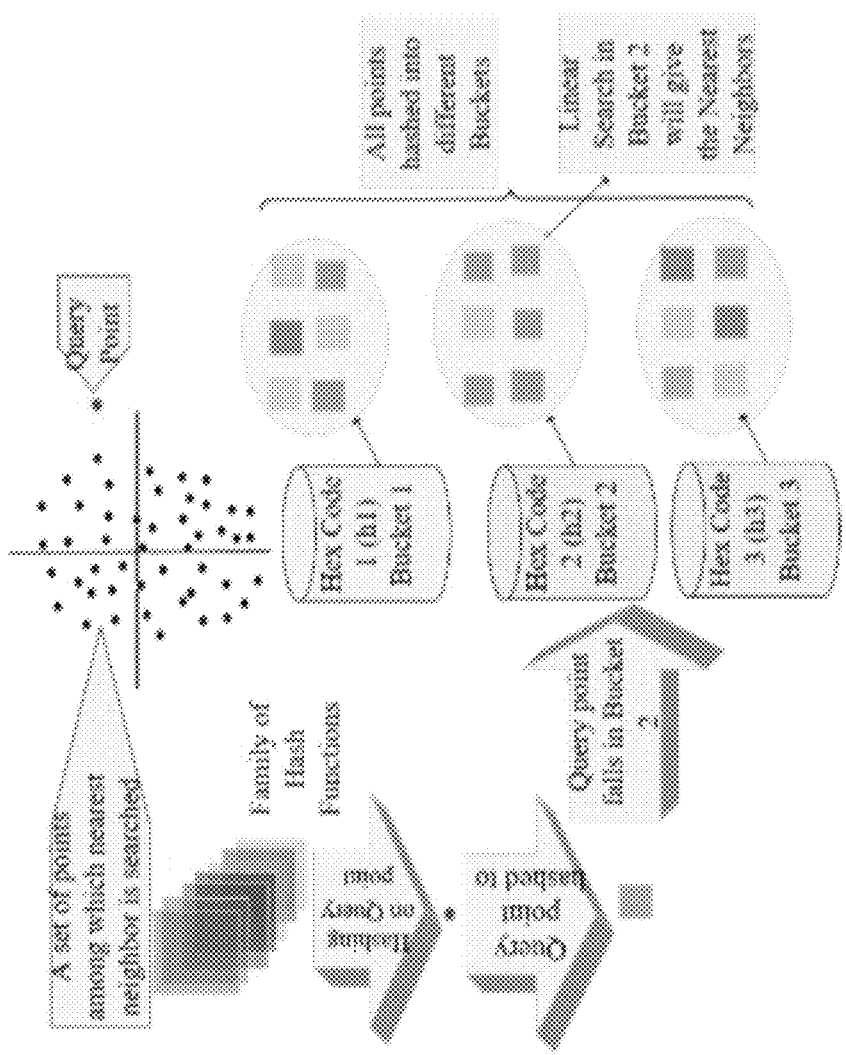
FIG. 8 is a graphical representation showing locality sensitive hashing.

LSH is an approximate nearest-neighbor search method that significantly reduces the computation time with the minimal probability of failing to determine the nearest neighbor closest match. Several hash functions are used to hash data points to ensure high probability of collision for closer objects based on the principle that two points that are close in the space will stay the same after hashing operation. Once the hashing is complete, a new query point coming in for the Nearest Neighbor search is hashed and all points from the bucket where query points falls in are retrieved. For a query point q and a near neighbor $r \in B(q,r)$ collision on some hash function implies, $$1 - (1 - p_1^k)^H \geq 1 - \epsilon$$

where, H represents the number of hash tables and k represents the number of bits used for keys. For a fixed value of H and k, time taken to compute H functions $f_i$ for query point q where some hash functions are reused, getting the buckets $f_i(q)$ from the hash tables and computing the distance to all the points in retrieved buckets is given by $$T = O(dk\sqrt{H}) + O(dn)$$

where, n is the number of points encountered in the buckets. An illustration of the LSH method is shown in FIG. 8. The computation time improvements for various values of k and H are tabulated in Tables 1, 2 and 3. It is evident that the computation time for 7 hash tables and 25 bits is most efficient. Significant speed improvements are found over the baseline method. For the lower values of H and k due to linear search in the buckets the computation time tends to be large in contrast to higher value of H and lower value of k where both table formation and linear search in buckets cause increase in time complexity.

Figure 9:
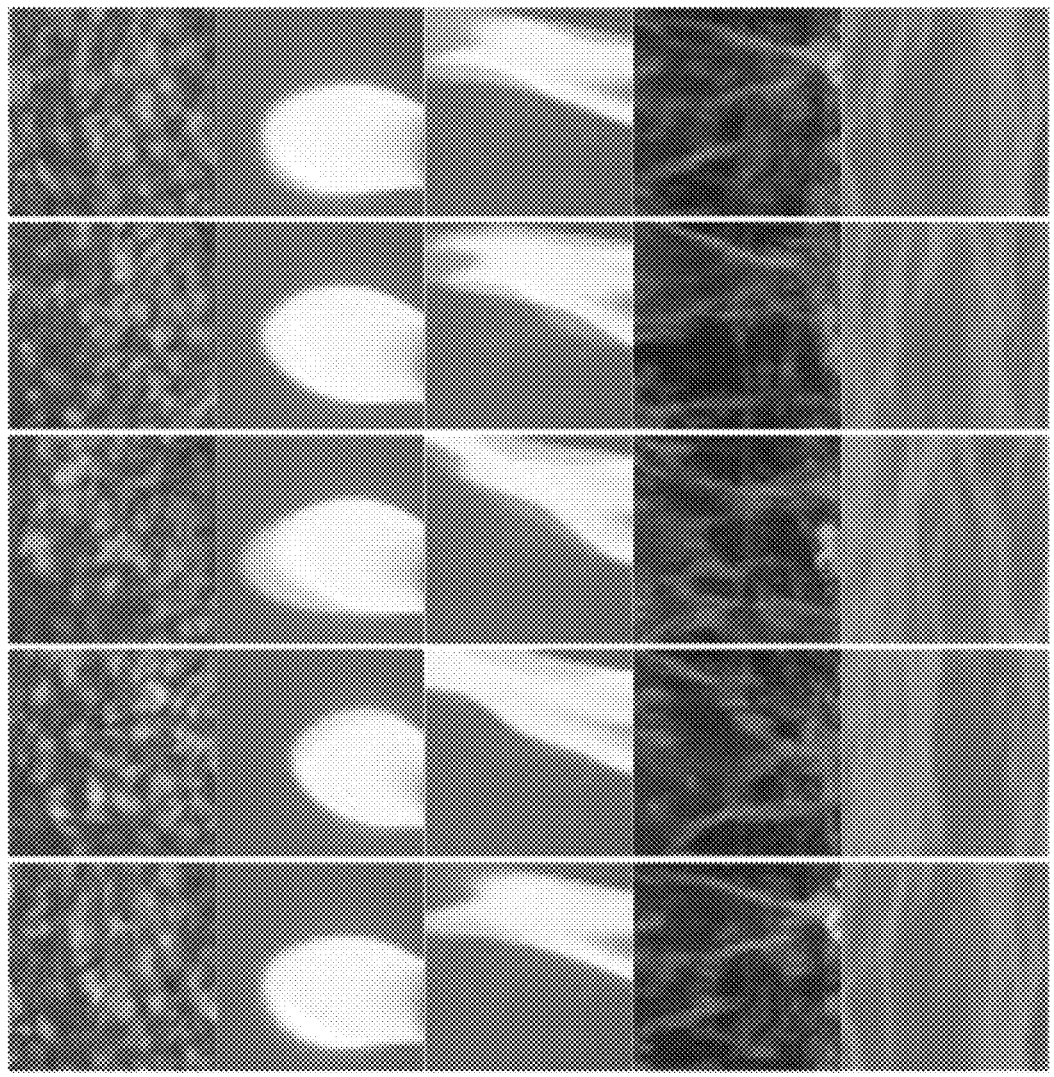
FIG. 9 shows several examples of predicted frames using images of boiling water, a candle, fire, a fountain and an ocean, respectively.

Qualitative Analysis of Prediction Quality:

In FIG. 9. results of the disclosed video prediction method are shown. For the results, only 75 input frames were used and 780 frames were synthesized, with almost no loss in perceptual quality. This highlights the long-range predictive power of the present system, which together with the favorable computational benefits make it a compelling approach for video prediction.

Quantitative Assessment of Prediction Quality:

To test whether the proposed video prediction method achieves favorable prediction accuracy, additional experiments were conducted to measure prediction Peak Signal to Noise Ratio (PSNR). The PSNRs of the baseline method and the proposed fast prediction method were compared, where the best performing combination of parameters from Table 1 were used—i.e. $k=25, H=7$. The results of this comparison are presented in Table 4. It is observed that the disclosed method achieves almost identical PSNR values to the baseline method at a fraction of the computational time. For further assessment of the video quality the FSIM metric is used and a comparison is drawn between the baseline method and the disclosed method. Results of the same are presented in Table 4.

TABLE 1

|  | K-NN | LSH (k = 5) | LSH (k = 10) | LSH (k = 15) | LSH (k = 20) | LSH (k = 25) |
| --- | --- | --- | --- | --- | --- | --- |
| Boiling Water | 511.36 | 161.69 ± 6.77 | 160.88 ± 5.83 | 139.08 ± 6.72 | 121.73 ± 6.67 | 115.26 ± 7.73 |
| Candle | 497.71 | 162.04 ± 4.83 | 148.35 ± 4.89 | 116.85 ± 6.15 | 96.99 ± 6.07 | 97.83 ± 6.47 |
| Fire | 548.39 | 158.18 ± 3.51 | 162.96 ± 3.77 | 142.47 ± 5.70 | 113.70 ± 6.02 | 103.76 ± 5.73 |
| Fountain | 484.48 | 160.10 ± 2.08 | 154.77 ± 4.60 | 148.71 ± 4.99 | 112.72 ± 6.34 | 110.57 ± 5.45 |
| Sea | 413.18 | 147.84 ± 2.49 | 149.89 ± 3.54 | 141.90 ± 6.34 | 132.56 ± 6.34 | 125.65 ± 5.63 |

Table 1 shows computation time (in seconds) for H=7. Note column 1 where exhaustive K-NN is used. There is significant computation time difference compared to other columns where LSH with different k values is used. Note that for different k values, the computation time is stabilized however it is optimal for k=25 depicted in bold.

TABLE 2

|  | K-NN | LSH (k = 5) | LSH (k = 10) | LSH (k = 15) | LSH (k = 20) | LSH (k = 25) |
| --- | --- | --- | --- | --- | --- | --- |
| Boiling Water | 511.36 | 155.10 ± 4.52 | 159.92 ± 6.10 | 161.78 ± 4.27 | 142.24 ± 5.81 | 123.60 ± 4.77 |
| Candle | 497.71 | 169.02 ± 4.19 | 165.87 ± 5.19 | 138.32 ± 5.45 | 130.90 ± 4.98 | 108.92 ± 6.28 |
| Fire | 548.39 | 161.86 ± 4.67 | 158.81 ± 5.30 | 152.74 ± 2.90 | 151.13 ± 6.28 | 139.85 ± 5.94 |
| Fountain | 484.48 | 165.21 ± 4.97 | 164.66 ± 3.49 | 161.90 ± 4.8 | 157.03 ± 4 | 145.73 ± 5.85 |
| Sea | 413.18 | 151.36 ± 6.45 | 159.69 ± 6.09 | 159.14 ± 4.47 | 150.80 ± 5.41 | 142.8 ± 6.71 |

Table 2 is the computation time (in seconds) table for H=12. In Table 2, the last column which uses LSH with k=25 bits is most optimal in terms of computation time however it is slightly more than the optimal column in Table 1.

TABLE 3

|  | K-NN | LSH (k = 5) | LSH (k = 10) | LSH (k = 15) | LSH (k = 20) | LSH (k = 25) |
| --- | --- | --- | --- | --- | --- | --- |
| Boiling Water | 511.36 | 164.90 ± 5.96 | 161.15 ± 4.76 | 167.47 ± 5.27 | 162.05 ± 4.97 | 129.84 ± 5.82 |
| Candle | 497.71 | 156.51 ± 3.62 | 157.99 ± 5.51 | 146.74 ± 5.03 | 136.43 ± 5.39 | 102.57 ± 3.09 |
| Fire | 548.39 | 161.38 ± 4.16 | 162.32 ± 5.58 | 157.62 ± 4.56 | 151.91 ± 5.18 | 141.25 ± 5.70 |
| Fountain | 484.48 | 160.24 ± 3.08 | 160.13 ± 3.51 | 159.88 ± 5.41 | 156.67 ± 5.79 | 145.10 ± 4.06 |
| Sea | 413.18 | 154.67 ± 5.46 | 156.31 ± 4.83 | 155.15 ± 2.09 | 151.76 ± 5.54 | 155.27 ± 3.01 |

Table 3 shows the computation time (in seconds) table for H=17. In Table 3, the computation time in LSH columns with smaller k values is higher than the corresponding LSH columns in other two tables. This is due to computation time increase in hash table formation as well as linear search in the query point bucket.

TABLE 4

|  | K-NN (PSNR) | LSH (PSNR) | K-NN (FSIM) | LSH (FSIM) |
| --- | --- | --- | --- | --- |
| Boiling Water | 17.57 | 17.61 | 0.75 | 0.746 |
| Candle | 13.37 | 13.33 | 0.79 | 0.79 |
| Fire | 15.39 | 15.38 | 0.777 | 0.7772 |
| Fountain | 18.64 | 18.66 | 0.745 | 0.741 |
| Sea | 23.15 | 23.15 | 0.767 | 0.768 |

In Table 4, Columns 1 and 2 represent PSNR and Columns 3 and 4 represent FSIM for 75 frames generated by Exhaustive K-NN method and LSH with k=25 respectively. It is evident that comparable visual quality frames are obtained in less computation time using the LSH method.

The algorithm serves as a good proof of concept towards utilizing skyline dynamical model and Riemannian geometry-based computations to classify the sky attributes. These exponential maps and geometry-based computations serve as the tool towards all applications where the parameters or points lie in non-Euclidean space like Grassmannian manifold. Application of multivariate statistical tools becomes possible for the tangent vectors obtained.

Consensus Based Distributed Fault Detection

The traditional approach for fault detection involves gathering the data at a single fusion center and then executing a statistical or machine learning algorithm to detect faults. For a utility-scale Cyber physical system, this process requires a large amount of memory, power, and communication bandwidth. Thus, there is a need to optimize resource consumption and improve fault detection capabilities.

In recent years, decentralized and distributed approaches are gaining rapid acceptance due to its inherent advantages over centralized systems. In some embodiments, a distributed Euclidean distance-based outlier detection algorithm, us used for fault detection. Each sensor is considered as an agent, which can communicate only with its neighbor and computes certain local functions to reach consensus on their state values.

System Model:

Consider each sensor to be a node in an undirected graph $\mathbb{G}=(\mathbb{V},\mathbb{E})$ with N nodes, where $\mathbb{V}$ is the set of nodes and $\mathbb{E}$ is the set of edges connecting the nodes. Two nodes can communicate with each other if they are within a Euclidean distance of $\epsilon$. The set of neighbors of node i is denoted by $\mathbb{N}_i = \{j | (i, j) \in \mathbb{E}\}$. The degree of the $i^{th}$ node, denoted by $d_i$, is the number of neighbors of the $i^{th}$ node. The degree matrix D is a diagonal matrix that contains the degrees of the nodes. The connectivity structure of the graph is defined by the adjacency matrix $A=\{a_{ij}\}$ where, $a_{ij}=1$ if $(i, j) \in \mathbb{E}$ and $a_{ij}=0$, otherwise. The graph Laplacian L is a positive semi-definite matrix defined by L=D−A.

Distributed Euclidean Distance-Based Outlier Detector:

Euclidean distance is a traditional measure of distance from geometry, extending to n-dimensions. In one embodiment of the present system, n=2, with current and voltage comprising the dimensions of data. Euclidean distance between two points, x and y, in a 2-D plane is given by, $$d_{Eu}(x,y) = \|x-y\|_2 = \sqrt{(x-y)^T(x-y)}$$

To get an intuition, consider (v*, i*) to be the values corresponding to the maximum power point, any set of (v, i) pairs outside the radius of $\gamma$ (threshold) with (v*, i*) as center, will be considered as outliers. To implement the Euclidean distance based outlier detector in a distributed way, a distributed average consensus algorithm is used to compute the mean of voltage and current measurements as in Eq. (6)-(7).

$$v_k^{t+1} = v_k^t + \alpha^t \sum_{j \in N_k} a_{kj}(v_j^t - v_k^t) \text{ and } \lim_{t \to \infty} v_k^{t+1} = v_{avg}$$

$$i_k^{t+1} = i_k^t + \alpha^t \sum_{j \in N_k} a_{kj}(i_j^t - i_k^t) \text{ and } \lim_{t \to \infty} i_k^{t+1} = i_{avg}$$

The module is considered faulty if $\sqrt{(v_{avg}-v_k)^2+(i_{avg}-i_k)^2} > \gamma$, where k={1, 2, . . . , n}, and $i_k^t$ denotes the values of voltage and current of the kth module at iteration t.

Figure 10:
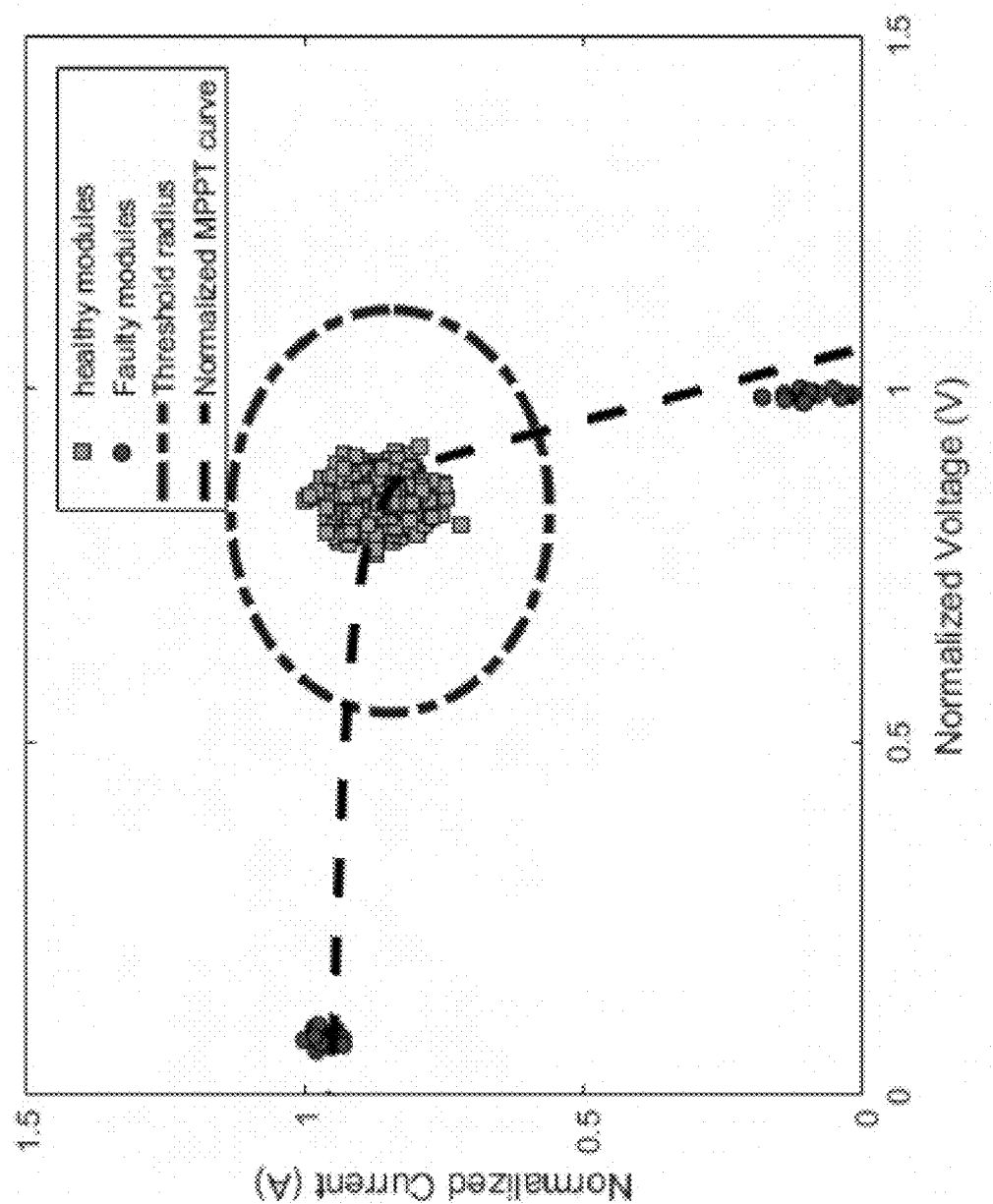
FIG. 10 is a graphical representation showing a simulation of the distributed Euclidean distance-based detector on synthetic data.

The Euclidean distance-based detector is not scale-invariant, i.e. if the current measurement is in the order of Amps and voltage measurement is in the order of hundreds of volts, then the Euclidean distance almost entirely depends on the difference in voltage between the two points while ignoring the significance of the current measurement. This problem can be solved by applying the distributed procedure on the normalized current and voltage measurements, as shown in FIG. 10. The current and voltage measurements can be normalized by simply dividing by the maximum of the measurement, which can be computed distributively using the Max-consensus algorithm.

Design of Solar Experimental Research Facility

Figure 2:
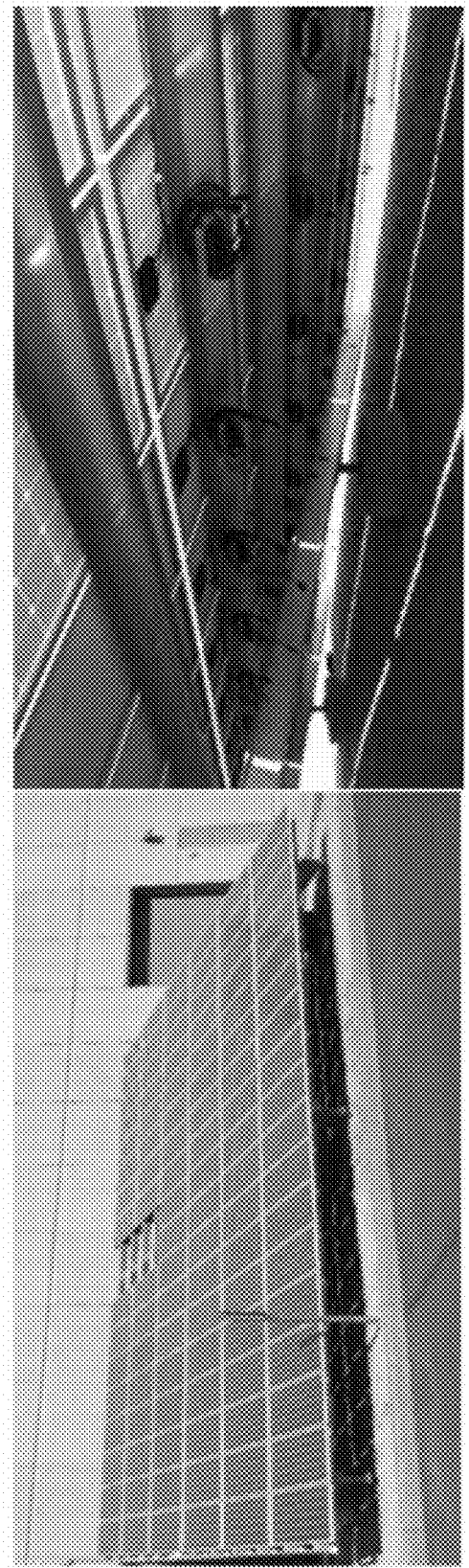
FIG. 2A is a picture showing an 18 KW solar monitoring facility fitted with sensors and actuators.
FIG. 2B is a picture showing smart monitoring devices fitted on each solar panel.
Figure 3:
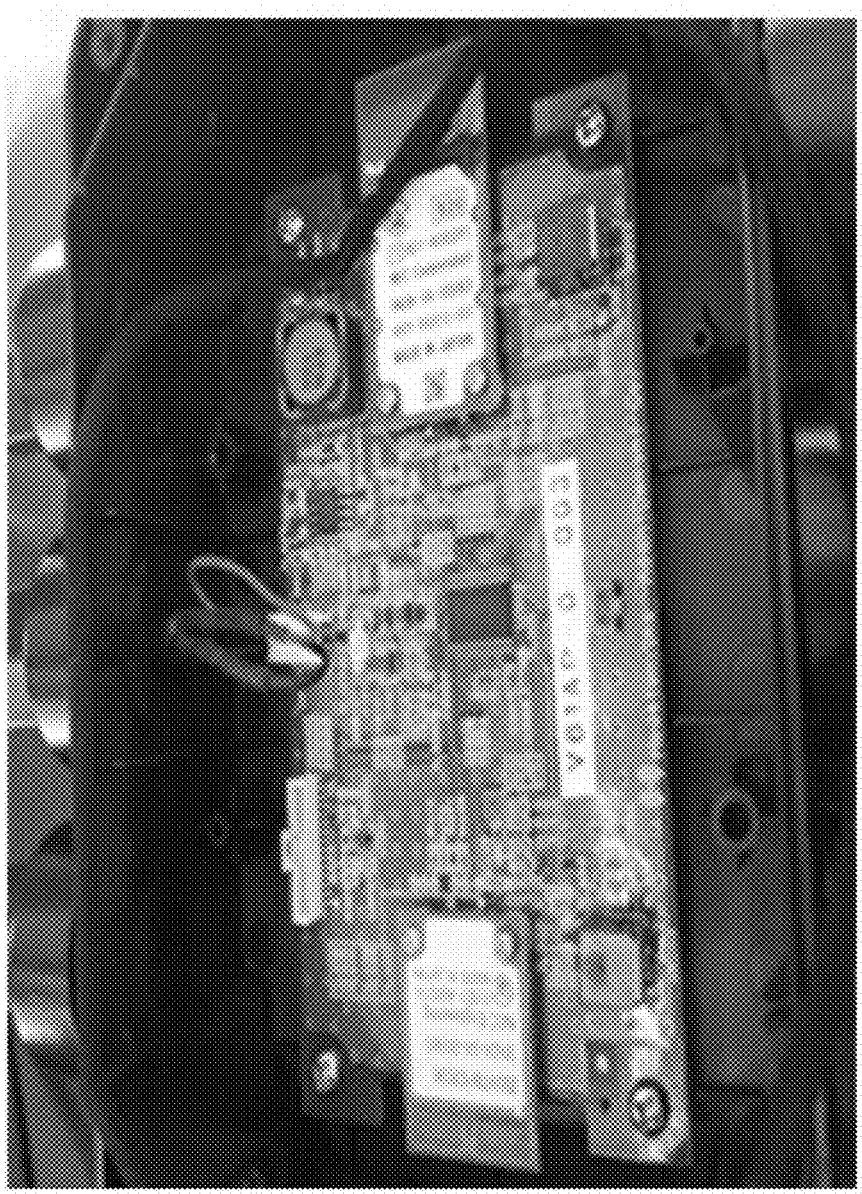
FIG. 3 is a picture of smart monitoring devices (SMDs) used for solar monitoring and control.

The research facility is depicted in FIGS. 2A and 2B. This structure consists of 104 PV panels, each with a smart monitoring device, installed atop an elevated steel frame. Each SMD (FIG. 3) can measure current, voltage, irradiance, and temperature of the associated panel periodically. These devices are networked and can provide data to servers, control centers and ultimately to mobile devices. Each SMD not only provides analytics for each panel but also contains relays that can be remotely controlled and via wireless access. Relays can bypass or change connectivity configuration, e.g., series to parallel. All data is wirelessly transmitted to a central hub with minimal power loss. Additionally, each smart hardware device can reconfigure connections with its nearest neighbors.

Figure 11:
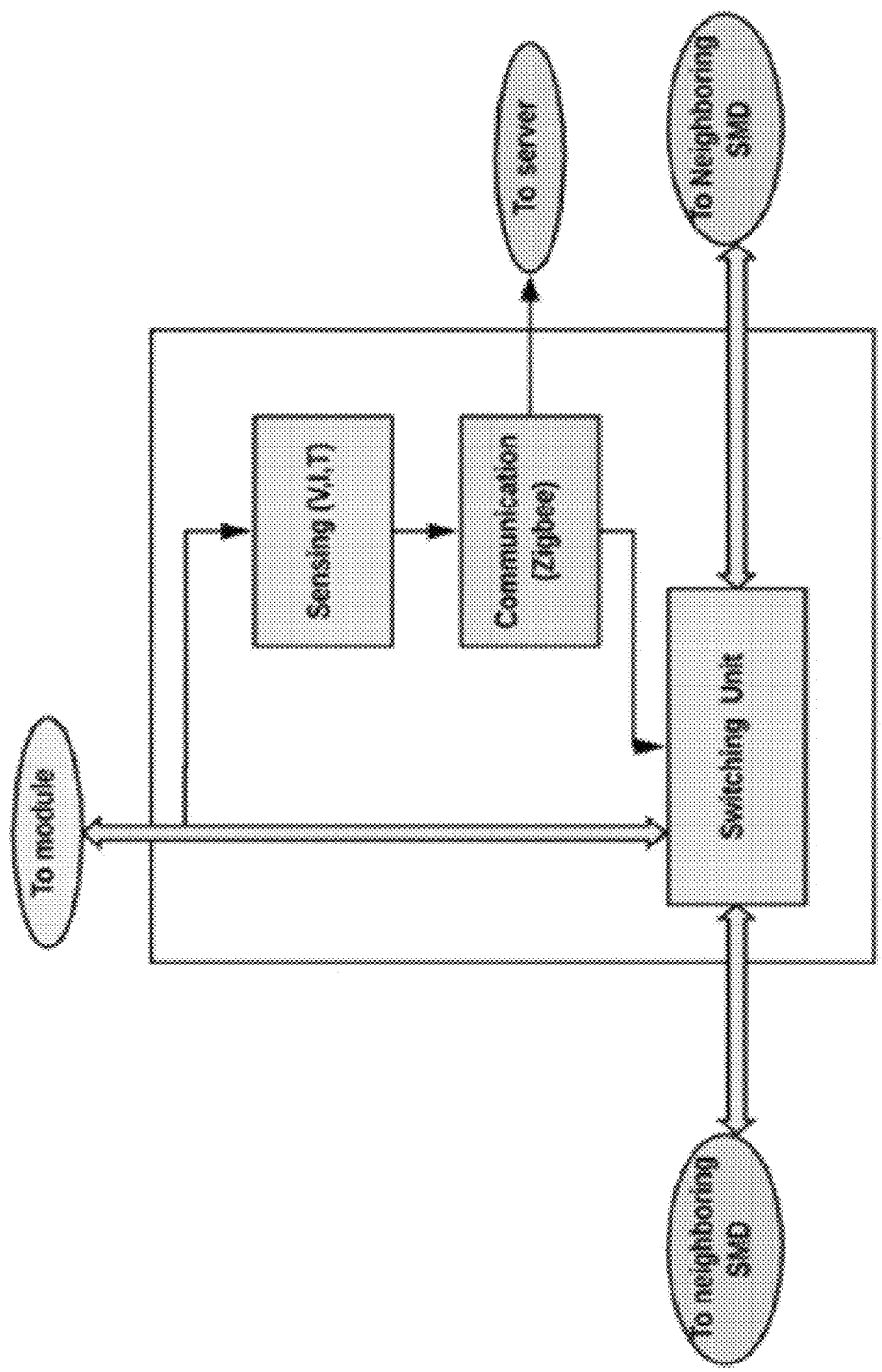
FIG. 11 is a simplified block diagram showing the internal connection of an SMD.

The SMD has 6 connectors, of which two connectors are for the positive and negative leads of the associated panel and two leads each are assigned to the two neighboring SMDs, shown in FIG. 11. These interconnections aid the dynamic reconfiguration of the series and parallel strings. Each SMD includes relays to alternate the topology configuration of the panels within the array. Three modes are available: series, parallel, and bypass. A faulty panel can easily be removed from the system to prevent mismatch losses by using the bypass mode. In some cases, the default topology may be suboptimal. In these cases, the series and parallel modes are used to define an alternate topology. Neighboring modules are connected first in parallel and then in series, a configuration known as the total cross tied (TCT) topology.

Figure 12:
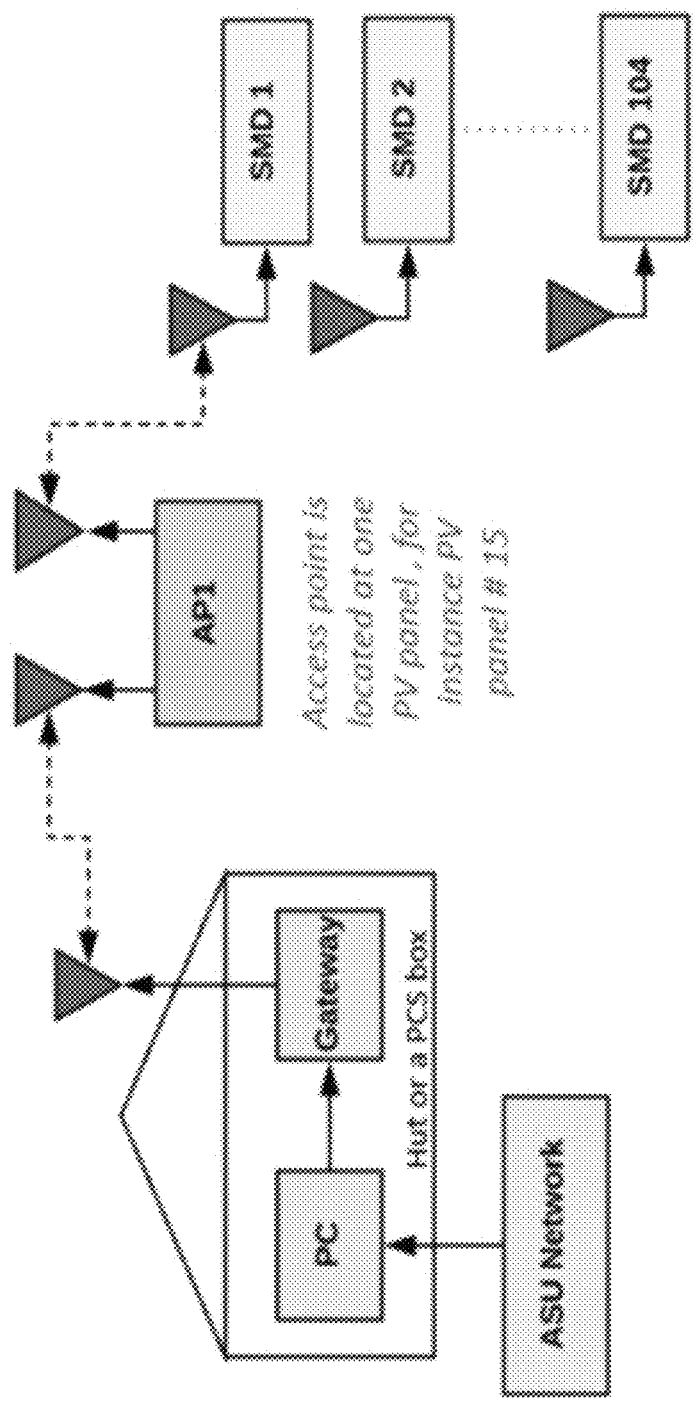
FIG. 12 is a simplified block diagram showing communication between SMDs and a server.

A schematic of the communication between the SMDs and the server is depicted in FIG. 12. Each SMD communicates wirelessly to an access point located at one of the PV panels. This access point, in turn, communicates with a central gateway which is connected to a server through USB. Each of the SMDs within the array is equipped with ZigBee wireless communication hardware. To minimize power consumption by the SMDs, the ZigBee transceivers do not transmit continuously. Instead, they periodically report voltage, current, and temperature measurements. A ZigBee hub device connected to the server receives all the reported data and transmits control signals to the networked SMDs.

Figure 13:
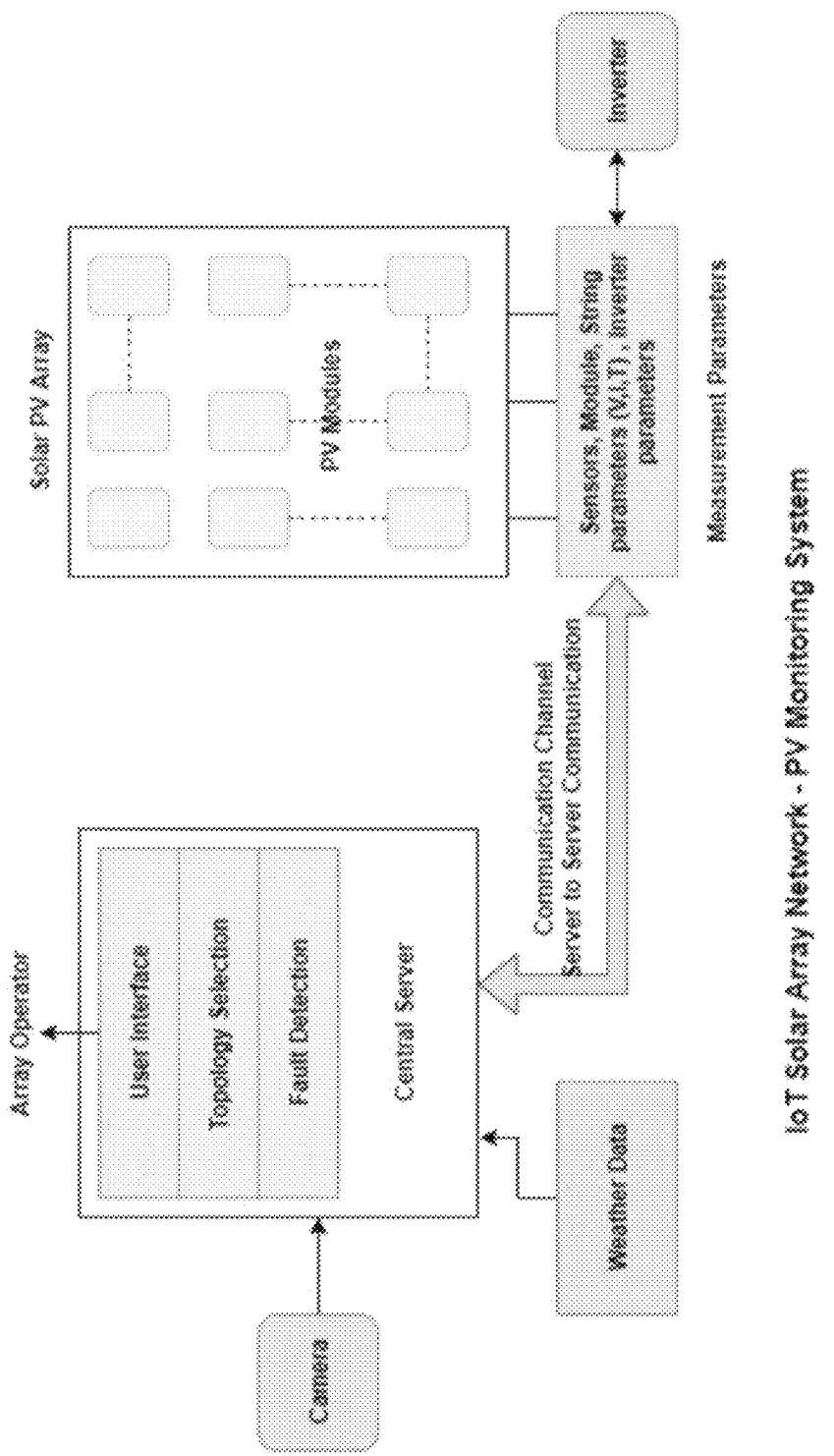
FIG. 13 is a simplified block diagram showing the IoT Networked PV Array Concept.

IoT Solar Array Analytics:

The overall concept for IoT analytics for solar farms is illustrated in the block diagram of FIG. 13. The PV modules form a matrix whose connections are controlled by relays embedded in the SMD. The connection topology of the array can be changed by issuing a local or a remote (IoT) instruction. If the fault detection algorithm indicates a faulty panel that disrupts the efficiency of the PV array, the panel can be bypassed by issuing a programming command to the appropriate SMD. IoT node control will enable the user of the system to change the connections from serial to parallel, for example, and form new connection topologies to respond to different shading conditions.

Figure 14:
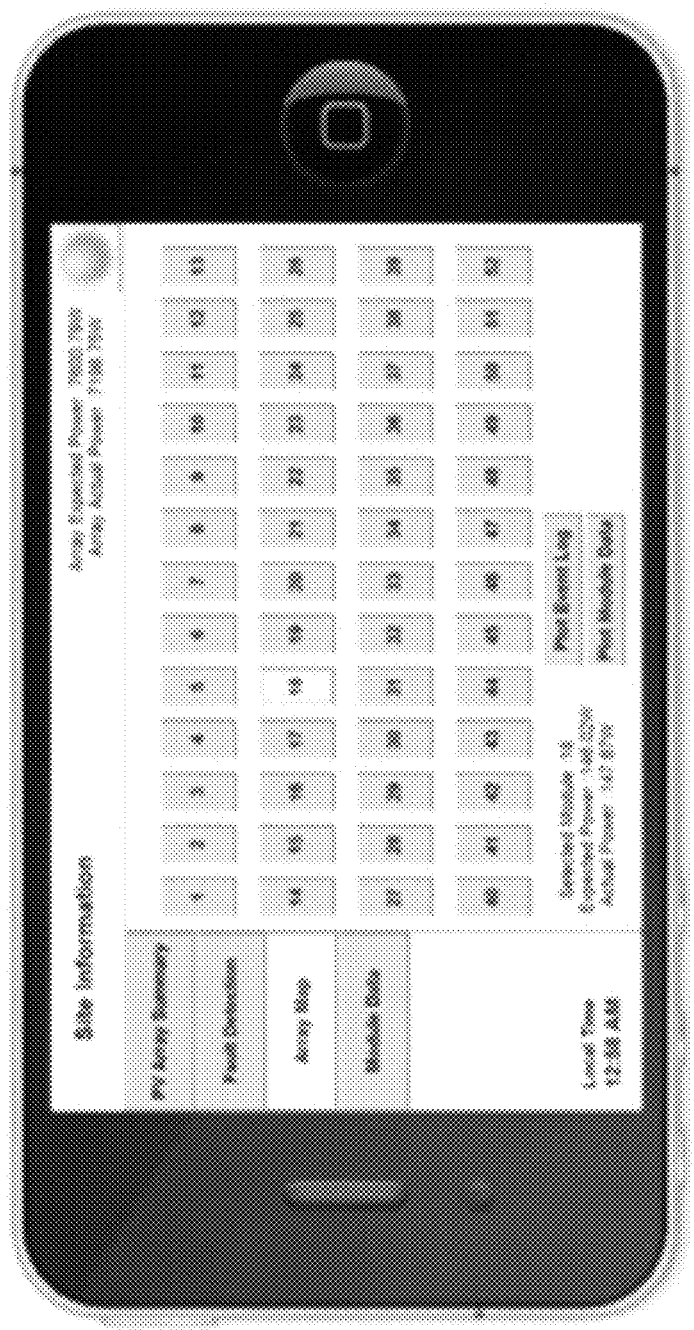
FIG. 14 is an image showing a mobile application interface to visualize the logged array data.

Graphical Interface:

A rendering of one embodiment of a graphical user interface (GUI) to access the collected PV array data is shown in FIG. 14. The monitoring software consists of a LabVIEW logging instrument with web-accessible component, a MATLAB™ simulation GUI, and Android application.

Computer-Implemented System

Figure 15:
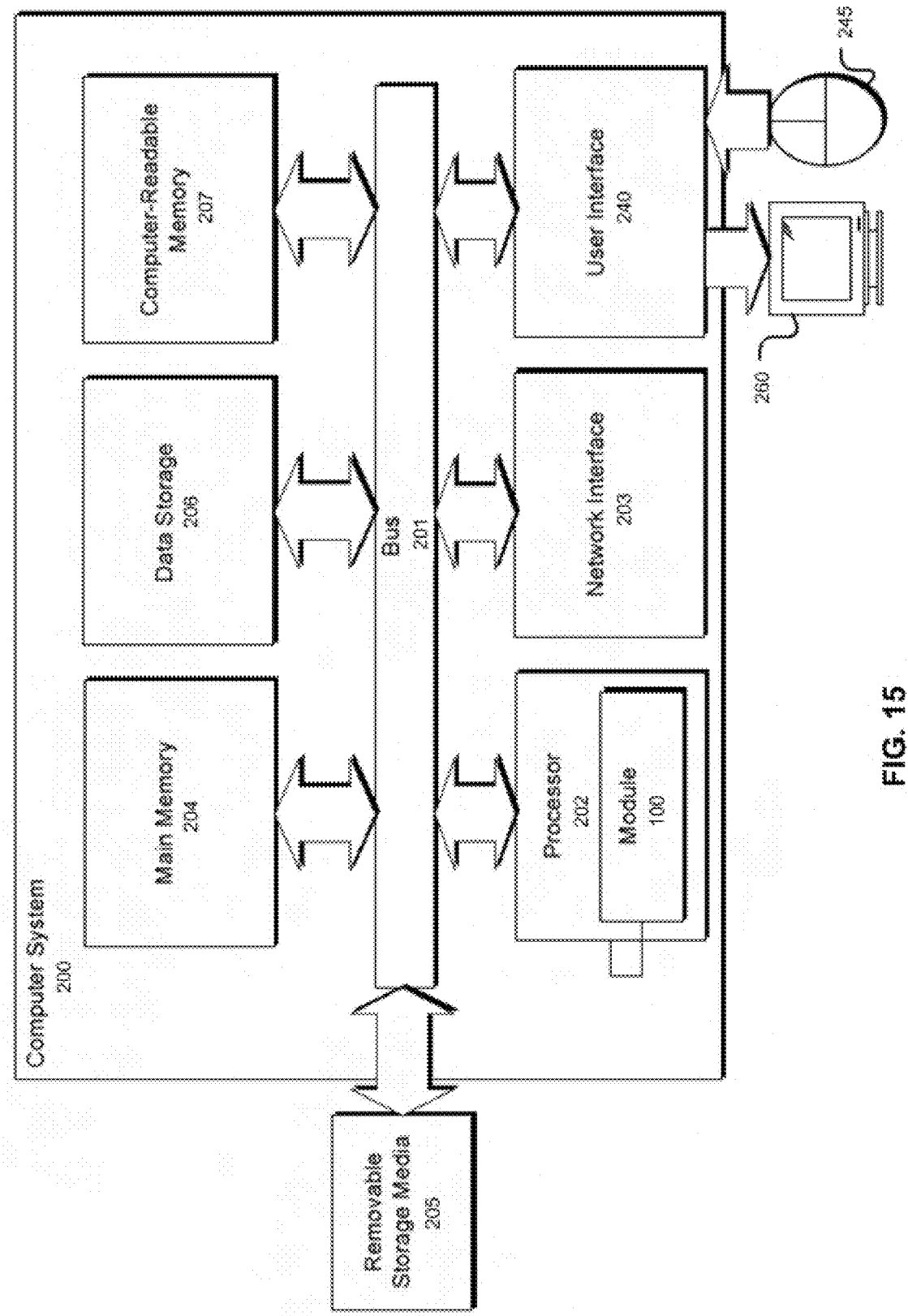
FIG. 15 is a simplified block diagram showing an example of a computing system that may implement various services, systems, and methods discussed herein.

FIG. 15 illustrates an example of a suitable computing and networking environment (computer system 200) which may be used to implement various aspects of the present disclosure, such as the system application 100. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software, in the form of a system application 100 or otherwise, may include a hardware-implemented module and may accordingly configure a processor 202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

As illustrated, the computing and networking environment 200 may be a general purpose computing device 200, although it is contemplated that the networking environment 200 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 200 may include various hardware components, such as a processing unit 202, a main memory 204 (e.g., a system memory), and a system bus 201 that couples various system components of the general purpose computing device 200 to the processing unit 202. The system bus 201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 200 may further include a variety of computer-readable media 207 that includes removable/non-removable media and volatile/non-volatile media, but excludes transitory propagated signals. Computer-readable media 207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EPSOM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 204 includes computer storage media in the form of volatile/nonvolatile memory such as read only memory (ROM) and random access memory (RAM). A basic input/output system (BIOS), containing the basic routines that help to transfer information between elements within the general purpose computing device 200 (e.g., during start-up) is typically stored in ROM. RAM typically contains data and/or program modules that are immediately accessible to and/or presently being operated on by processing unit 202. For example, in one embodiment, data storage 206 holds an operating system, application programs, and other program modules and program data.

Data storage 206 may also include other removable/non-removable, volatile/nonvolatile computer storage media. For example, data storage 206 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 200.

A user may enter commands and information through a user interface 240 or other input devices 245 such as a tablet, electronic digitizer, a microphone, keyboard, and/or pointing device, commonly referred to as mouse, trackball, or touch pad. Other input devices 245 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 245 are often connected to the processing unit 202 through a user interface 240 that is coupled to the system bus 201, but may be connected by other interface and bus structures, such as a parallel port, game port or a universal serial bus (USB). A monitor 260 or other type of display device is also connected to the system bus 201 via user interface 240, such as a video interface. The monitor 260 may also be integrated with a touch-screen panel or the like.

The general purpose computing device 200 may operate in a networked or cloud-computing environment using logical connections of a network Interface 203 to one or more remote devices, such as a remote computer. The remote computer may be a personal computer, a server, a router, a network PC, a peer device or other common network node, and typically includes many or all of the elements described above relative to the general purpose computing device 200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 200 may be connected to a public and/or private network through the network interface 203. In such embodiments, a modem or other means for establishing communications over the network is connected to the system bus 201 via the network interface 203 or other appropriate mechanism. A wireless networking component including an interface and antenna may be coupled through a suitable device such as an access point or peer computer to a network. In a networked environment, program modules depicted relative to the general purpose computing device 200, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for classifying a set of video features, comprising:
   accessing a video representative of a first set of video features;
   modeling the video representative of the first set of video features as a linear dynamical system;
   obtaining an observability matrix for the linear dynamical system;
   extracting a set of tangent vectors using the observability matrix, wherein the set of tangent vectors is representative of the linear dynamical system;
   developing a probability density function representative of the linear dynamical system based on the set of tangent vectors;
   assigning a score to a set of video features by evaluating the probability density function for each set of video features;
   obtaining a spatiotemporal representation of the set of video features in terms of Lyapunov exponents; and
   classifying a set of video features using a combination of the spatiotemporal representation and the score, wherein the largest Lyapunov exponents are representative of transition phases between a set of classes.

2. The system of claim 1, wherein the set of tangent vectors lie on a Grassmannian manifold.

3. The system of claim 1, wherein the probability density function lies on a Grassmannian manifold.

4. The system of claim 1, wherein the linear dynamical system is driven by zero mean white Gaussian noise.

5. A method for predicting a set of future video features, comprising:
   accessing a video, wherein the video is representative of a set of video features;
   developing a time series matrix using a set of pixel values from the video;
   developing a phase space matrix from the time series matrix, wherein the phase space matrix is representative of the time series matrix in phase space, wherein phase space models all possible states of a system; and
   calculating a set of trajectories in phase space, wherein the set of trajectories in phase space is calculated by performing kernel regression on a weighted average of neighboring points in phase space, wherein the neighboring points are selected using locality sensitive hashing;
   wherein the set of trajectories in phase space is representative of a predicted set of pixel values,
   wherein the predicted set of pixel values is representative of a set of future video features.

6. The method of claim 5, wherein the time series matrix comprises pixel values for a plurality of pixel locations in Cartesian space, wherein the pixel values vary over time.

7. The system of claim 5, wherein a subject of the video comprises a skyline, wherein the set of video features is representative of the skyline.

8. The method of claim 5, wherein the phase space matrix is developed using embedding parameters intrinsic to the time series matrix, wherein the embedding parameters comprise embedding delay and embedding dimension.

9. The method of claim 5, wherein a minimum embedding delay is obtained by finding a lowest mutual information between samples expressed in the time series matrix.

* * * * *